United States Patent
Elad et al.

(10) Patent No.: US 9,036,885 B2
(45) Date of Patent: May 19, 2015

(54) IMAGE RECONSTRUCTION IN COMPUTED TOMOGRAPHY

(71) Applicant: Technion Research & Development Foundation Limited, Haifa (IL)

(72) Inventors: Michael Elad, Kiryat-Tivon (IL); Joseph Shtok, Haifa (IL); Michael Zibulevsky, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 24 days.

(21) Appl. No.: 14/060,735

(22) Filed: Oct. 23, 2013

(65) Prior Publication Data

US 2014/0119628 A1    May 1, 2014

Related U.S. Application Data

(60) Provisional application No. 61/719,451, filed on Oct. 28, 2012.

(51) Int. Cl.
*G06K 9/00* (2006.01)
*G06T 11/00* (2006.01)
*A61B 6/00* (2006.01)

(52) U.S. Cl.
CPC .......... *G06T 11/006* (2013.01); *G06T 2211/424* (2013.01)

(58) Field of Classification Search
CPC .................................. G06T 11/00; A61B 5/00
USPC ......... 382/128, 129, 130, 131, 132, 133, 134; 378/4, 8, 21–27, 901; 600/407, 410, 600/425, 427
See application file for complete search history.

(56) References Cited

U.S. PATENT DOCUMENTS 8,155,416 B2 * 4/2012 Nields et al. .................. 382/131
8,543,195 B1 * 9/2013 Brockway et al. ............ 600/509

\* cited by examiner

*Primary Examiner* — Abolfazl Tabatabai

(57) ABSTRACT

A method of projection domain processing based on a local transform and shrinkage for use in reconstructing digital images from a set of projections, the method including providing a target image of a target object, providing projection data of the target object, producing filtered projection data by applying a sparsifying transform and a shrinkage function to the projection data, followed by an inverse of the sparsifying transform, producing a restored image by applying a reconstruction transform to the filtered projection data, comparing the restored image to the target image, and producing an optimized projection domain shrinkage function by adapting the shrinkage function to minimize differences between the restored image and the target image. Related apparatus and methods are also described.

22 Claims, 18 Drawing Sheets

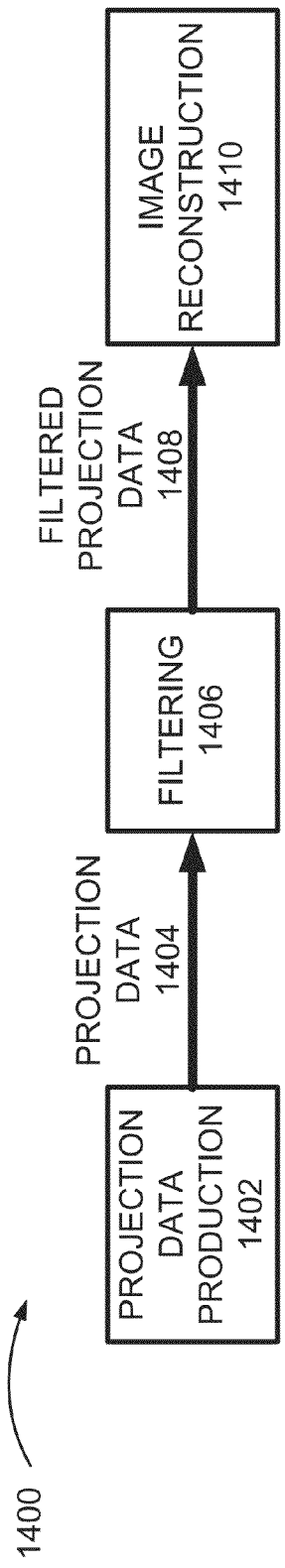
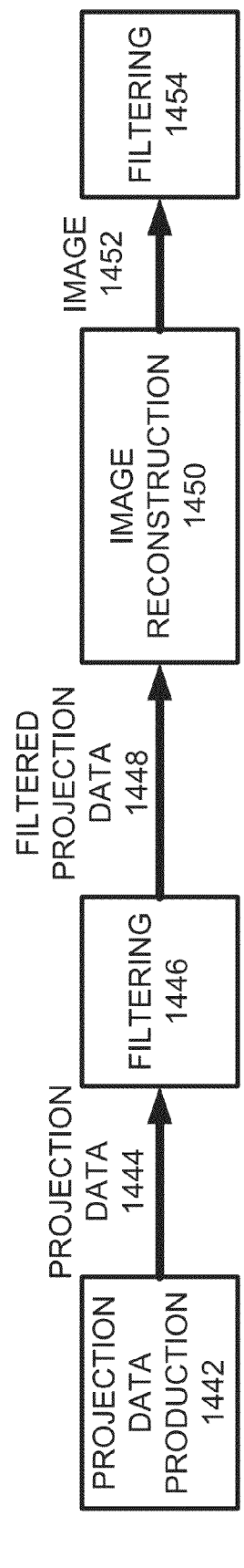
FIGURE 14A
FIGURE 14B

IMAGE RECONSTRUCTION IN COMPUTED TOMOGRAPHY

RELATED APPLICATION

This application claims the benefit of priority under 35 USC §119(e) of U.S. Provisional Patent Application No. 61/719,451 filed Oct. 28, 2012, the contents of which are incorporated herein by reference in their entirety.

FIELD AND BACKGROUND OF THE INVENTION

The present invention, in some embodiments thereof, relates to Computed Tomography (CT), and, more particularly, but not exclusively, to methods for reconstruction of images from projection data in computed tomography.

A Computed Tomography (CT) scan enables estimation of attenuation coefficients of scanned object components by comparing a flow of photons entering and exiting the scanned object along straight lines. Theoretically, a log-transformed photon count information corresponds to an X-ray transform of the attenuation function, and should provide a perfect reconstruction. In practice, measurement data is limited by a discrete sampling scheme, and is degraded by a number of physical phenomena occurring in a scanner. The first mentioned problem is an inevitable but minor cause for the limited resolution in the CT images; mainly, the images are corrupted by the data degradation factors. Some of the factors are: off-focal radiation; detector afterglow and crosstalk; beam hardening; and Compton scattering. The factors introduce a structured bias into the measurements.

Another source of deterioration, which is dominant in a low-dose scenario, is stochastic noise. One type of noise stems from low photon counts, which occur when the X-rays pass through high-attenuation areas. The phenomenon is similar to the photon starvation occurring in photo cameras in poor lighting conditions. Statistically, in such cases, data is modeled as an instance of Poisson random variables.

Another type of noise originates from the noise present in the detectors. This noise is modeled as an additive Gaussian random process.

A basic reconstruction transform, Filtered Back-Projection (FBP) [3], takes a limited account of the noise statistics: FBP employs a low-pass 1-D convolution filter in the projection domain, which parameters are preset for specific anatomical regions and standard scan protocols. As a result, the problem of photon starvation manifests in the output image in the form of streak artifacts. Each measured line integral is effectively smeared back over that line through the image by the back-projection; an incorrect measurement results in a line of wrong intensity in the image. Typically, the streaks radiate from bone regions or metal implants, which corrupt its contents and jeopardize its diagnostic value.

Images of better quality—having reduced artifacts and increased spatial resolution—are obtained with statistically based methods, which solve the Maximum-a-Posteriori (MAP) problem. In this case the MAP problem is expressed as a minimization of the Penalized Likelihood (PL) objective function. The likelihood expression models the aforementioned physical phenomena associated with the scan as well as the noise statistics, and an additional penalty component models expected properties of the CT images, that is, includes prior information about an image to be reconstructed. The PL objective can be designed to restore a true sinogram from noisy observations [4], [5] or to reconstruct an output CT image [6]. Usually, the PL equation is difficult to solve, so it is replaced by the second-order approximation, Penalized Weighted Least Squares (PWLS) [6], [7]. A drawback of reconstruction based on explicit statistical modeling is a computationally heavy iterative solution.

An alternative approach to the problem is to use adaptive signal processing techniques, implicitly modeling the signal properties. The techniques are applied in a non-iterative fashion, and have a computational complexity comparable to the FBP. Demirkaya [8] uses a nonlinear anisotropic diffusion filter for sinogram de-noising to reduce streak artifacts. For the same purpose, Hsieh [9] employs a trimmed mean filter adaptive to the noise variance. For each detector reading x, the algorithm adaptively chooses a number of its neighbors participating in the filtering operation and then the value of x is replaced with the trimmed mean of these neighbors (a portion of highest and lowest values among the neighbors is discarded). Thus, to some extent, the aforementioned statistical model of the scan is used: noisy samples get stronger filtering than the more reliable ones. Experimental results in the above-mentioned work are impressive.

A similar concept, with a different kind of filter, is adopted by the work of Kachereiss et al, who apply adaptive convolution-based filtering in the projection domain [10]. The filter width is data dependent, so that their algorithm leaves low-valued sinogram elements untouched.

Beyond the use of general-purpose tools, algorithms are known which apply machine learning methods to perform the processing, adaptive to tomographic data.

An example algorithm is described in [11]: measured projections are locally filtered according to a preliminary classification of regions in the measured projections. Classes and corresponding filters are derived automatically, via an off-line exemplar-based training process. The standard smoothing by a low-pass convolution filter is replaced with locally-adaptive filtering, optimized for signal quality on the training set. A common property of those listed works is a fast, non-iterative sinogram processing, which take a limited account of the statistical model for the measurements.

Finally, there are also post-processing methods operating in the image domain. Sauer and Liu design a set of non-stationary filters, trying to mend the effect of low-count noise [12]. Wavelet-based method is employed in the work of Borsdorf et al [13]. Using the recently available dual-source CT scan, the algorithm builds two versions of the reconstructed image from disjoint sets of measurements, and exploits a correlation between the wavelet coefficients of the two versions in order to reduce image noise.

Additional background art includes:

[1] J. Bian P. J. La Riviere and P. A. Vargas, "Penalized-likelihood sinogram restoration for computed tomography" IEEE Trans. Med. Imag., vol. 25, no. 8, pp. 1022-36, August 2006.

[2] K. D. Sauer J. Hsieh J.-B. Thibault, C. A. Bouman, "A recursive filter for noise reduction in statistical iterative tomographic imaging" in SPIE/IS&T Conference on Computational Imaging IV. 2006, vol. 6065, pp. 60650X-60650X-10, SPIE.

[3] F. Natterer, F, Wubbeling, Mathematical methods in image reconstruction, Section 5.1, in SIAM, 2001.

[4] J. Bian P. J. La Rivirre and P. A. Vargas, "Comparison of quadratic and median-based roughness penalties for penalized-likelihood sinogram restoration in computed tomography" Int. J. Biomed. Imaging, vol. 2006, pp. 1-7, 2006.

[5] J. Wang J. Wen H. Lu J. Hsieh T. Li, X. Li and Z. Liang, "Nonlinear sinogram smoothing for low-dose X-ray CT" IEEE Trans. Nucl. Sci., vol. 51, no. 5, pp. 2505-2513, 2004.

[6] I. A. Elbakri and J. A. Fessler, "Statistical image reconstruction for polyenergetic X-ray computed tomography" IEEE Trans. Med. Imag., vol. 21, no. 2, pp. 89-99, February 2002.

[7] H. Lu Z. Liang J. Wang, T. Li, "Penalized weighted least-squares approach to sinogram noise reduction and image reconstruction for low dose X-ray computed tomography" IEEE Trans. Med. Imag., vol. 25, no. 10, pp. 1272-1283, 2006.

[8] O. Demirkaya, "Reduction of noise and image artifacts in computed tomography by nonlinear filtration of projection images" 2001, vol. 4322, pp. 917-923, SPIE.

[9] J. Hsieh, "Adaptive streak artifact reduction in computed tomography resulting from excessive X-ray photon noise" Medical Physics, vol. 25, no. 11, pp. 2139-2147, 1998.

[10] O. R. Watzke M. Kachelriess and Willi A. Kalender, "Generalized multidimensional adaptive filtering for conventional and spiral single-slice, multi-slice, and cone-beam CT" Medical Physics, vol. 28, no. 4, pp. 475-490, 2001.

[11] K. D. Sauer B. I. Andia and C. A. Bouman, "Nonlinear backprojection for tomographic reconstruction" IEEE Trans Nucl. Sci., vol. 49, no. 1, pp. 61-68, February 2002.

[12] K. D. Sauer and B. Liu, "Nonstationary filtering of transmission tomograms in high photon counting noise" IEEE Trans. Med. Imag., vol. 10, no. 3, pp. 445-452, 1991.

[13] T. Flohr A. Borsdorf, R. Raupach and J. Hornegger, "Wavelet based noise reduction in CT-images using correlation analysis," IEEE Trans. Med. Imag., vol. 27, no. 12, pp. 1685-1703, 2008.

[14] Ing-Tsung Hsiao H. Lu, X. Li and Zhengrong Liang, "Analytical noise treatment for low-dose CT projection data by penalized weighted least square smoothing in the k-l domain" Proceedings of SPIE.

[15] Y. Hel-Or and D. Shaked, "A discriminative approach for wavelet denoising" IEEE Trans. Im. Proc., vol. 17, no. 4, 2008.

[16] G. N. Ramachandran and A. V. Lakshminarayanan, "Three-dimensional reconstruction from radiographs and electron micrographs: Application of convolutions instead of Fourier transforms" Proceedings of the National Academy of Sciences of the United States of America, vol. 68, no. 9, pp. 2236-2240, 1971.

[17] D. L. Donoho A. M. Brookstein and M. Elad, "From sparse solutions of systems of equations to modeling of signals and images" SIAM Review, vol. 51, no. 1, pp. 34-81, 2009.

[18] J. Shtok M. Zibulevsky M. Elad, B. Matalon, "A wide-angle view at iterated shrinkage algorithms" in SPIE (Wavelet XII), 2007, pp. 26-29.

[19] M. Zibulevsky and M. Elad, "L1-l2 optimization in signal and image processing" IEEE Signal Processing Magazine, vol. 27, no. 3, pp. 78-88, 2010.

[20] M. Elad, "Why simple shrinkage is still relevant for redundant representations?" IEEE Trans. on Information Theory, vol. 52, no. 12, pp. 5559-5569, December 2006.

[21] D. L. Donoho and I. M. Johnston, "Ideal spatial adaptation via wavelet shrinkage" Biometrika, vol. 81, no. 3, pp. 425-455, 1994.

[22] Y. Hel-Or A. Adler and M. Elad, "A shrinkage learning approach for single image super-resolution with overcomplete representations" ECCV 2010, pp. 622-635, 2010.

[23] F. J. Anscombe, "The transformation of Poisson, binomial and negative binomial data" Biometrika, vol. 35, no. 3/4, pp. 246-254, 1948.

[24] K. I. Kim J. H. Kim and C. E. Kwark, "A filter design for optimization of lesion detection in spect" IEEE Nuclear Science Symposium, vol. 3, pp. 1683-1687, 1996.

[25] J. Nocedal and S. J. Wright, Numerical Optimization, Section 6.1, Springer-Verlag, second edition, 2006.

[26] J. A. Fessler and W. L. Rogers, "Spatial resolution properties of penalized-likelihood image reconstruction: space-invariant tomographs", IEEE Trans. Im. Proc., vol. 5, no. 9, pp. 1346-1358, 1996.

[27] N. Ahmed, T. Natarajan, and K. R. Rao, "Discrete Cosine Transform", IEEE Trans. Computers, pp. 90-93, 1974.

The disclosures of all references mentioned above and throughout the present specification, as well as the disclosures of all references mentioned in those references, are hereby incorporated herein by reference.

SUMMARY OF THE INVENTION

The present invention, in some embodiments thereof, uses adaptive local processing of measurement data in a projection domain; adaptive local processing of image data in an image domain; and optionally a combination of both of the above methods.

The term sinogram refers herein to raw projection data obtained when projection-reconstruction imaging is used, and, in some cases, to projection data after optional regularization and/or normalization, such as, by way of a non-limiting example, a log transform of the projection data, as further explained below in a section named "C. Adjusted Measurements".

In some embodiments of the invention, a learned shrinkage function in the transform domain is used.

In some embodiments of the invention, shrinkage functions are trained via an off-line supervised learning procedure to achieve optimal performance on a training set of reference images, obtained using a high-intensity and a low intensity scan of the same object.

According to an aspect of some embodiments of the present invention there is provided a method of projection domain processing based on a local transform and shrinkage for use in reconstructing digital images from a set of projections, the method including: (a) providing a target image of a target object; (b) providing projection data of the target object; (c) producing filtered projection data by applying a sparsifying transform and a shrinkage function to the projection data, followed by an inverse of the sparsifying transform; (d) producing a restored image by applying a reconstruction transform to the filtered projection data; (e) comparing the restored image to the target image; and (f) producing an optimized projection domain shrinkage function by adapting the shrinkage function to minimize differences between the restored image and the target image.

According to some embodiments of the invention, the reconstruction transform includes Filtered Back Projection (FBP).

According to some embodiments of the invention, further including adjusting the projection data by applying a regularization operation to the projection data, and in which the sparsifying transform and the shrinkage function are applied to the regularized projection data.

According to some embodiments of the invention, the differences between the restored image and the target image are measured by calculating a Mean Square Error between pixels of the restored image and the target image.

According to some embodiments of the invention, the differences between the restored image and the target image are measured by calculating a faint-edge-promoting error calculation between the restored image and the target image.

According to some embodiments of the invention, the differences between the restored image and the target image are indicated by a person providing a subjective visual quality measure.

According to some embodiments of the invention, (c) to (f) are iterated in order to produce the optimized projection domain shrinkage functions by iterative improvement.

According to some embodiments of the invention, the shrinkage functions are characterized by a set of parameters including a set of fewer parameters than a dimension of the projection data.

According to some embodiments of the invention, the projection data is produced using a lower projection dose than a projection dose used for producing the target image.

According to some embodiments of the invention, the target object is a cadaver.

According to an aspect of some embodiments of the present invention there is provided a method of reconstructing images from a set of projections using an optimized projection domain shrinkage function including producing projection data of a target object; producing filtered projection data by applying a sparsifying transform, the optimized projection domain shrinkage function, and an inverse sparsifying transform to the projection data; and producing an image by applying a reconstruction transform to the filtered projection data.

According to an aspect of some embodiments of the present invention there is provided a method of producing a pair of projection domain and image domain shrinkage functions for use in reconstructing images from a set of projections, the method including: (a) producing an optimized projection domain shrinkage function according to the method of claim 1 and further including (b) producing optimized projection data by applying the optimized projection domain shrinkage function to the projection data; (c) producing an optimized restored image by applying a reconstruction transform to the optimized projection data; (d) producing a filtered restored image by applying a second, image domain, shrinkage function to the optimized restored image; (e) comparing the filtered restored image to the optimized target image; and (f) producing an optimized image domain shrinkage function by adapting the second, image domain, shrinkage function to minimize differences between the filtered restored image and the target image.

According to some embodiments of the invention, the image domain shrinkage function includes a parameter array of a smaller dimension than a dimension of the restored image.

According to an aspect of some embodiments of the present invention there is provided a method of image domain processing based on a sparsifying transform and a shrinkage function for use in reconstructing digital images from a set of projections, the method including: (a) providing a target image of a target object; (b) providing projection data of the target object; (c) producing a restored image by applying a reconstruction transform to the projection data; (d) producing a filtered restored image by applying a sparsifying transform, a shrinkage function, and an inverse sparsifying transform to the restored image; (e) comparing the filtered restored image to the target image; and (f) producing an optimized image domain shrinkage function by adapting the shrinkage function to minimize differences between the filtered restored image and the target image.

According to some embodiments of the invention, further including producing optimized projection data by applying a shrinkage function to the projection data, and in which the producing the restored image is by applying a reconstruction transform to the optimized projection data.

According to some embodiments of the invention, the differences between the restored image and the target image are measured by calculating a Mean Square Error between pixels of the restored image and the target image.

According to some embodiments of the invention, the differences between the restored image and the target image are measured by calculating a faint-edge-promoting error calculation between the restored image and the target image.

According to some embodiments of the invention, the differences between the restored image and the target image are indicated by a person providing a subjective visual quality measure.

According to some embodiments of the invention, (d) to (f) are iterated in order to produce the optimized image domain shrinkage function by iterative improvement.

According to some embodiments of the invention, the image domain shrinkage functions are characterized by a set of parameters including a set of fewer parameters than a dimension of the restored image.

According to some embodiments of the invention, the projection data is produced using a lower projection dose than a projection dose used for producing the target image.

According to some embodiments of the invention, the target object is a cadaver.

According to an aspect of some embodiments of the present invention there is provided a method of reconstructing images from a set of projections using an optimized image domain shrinkage function including producing projection data of a target object; producing an image by applying a reconstruction transform to the projection data; producing a filtered image by applying a sparsifying transform and the optimized image domain shrinkage function under the sparsifying transform, to the image.

According to an aspect of some embodiments of the present invention there is provided a method of reconstructing images from a set of projections using an optimized projection domain shrinkage function and an optimized image domain shrinkage function, including producing projection data of a target object; producing filtered projection data by applying a sparsifying transform and an optimized projection domain shrinkage function to the projection data; producing an image by applying a reconstruction transform to the filtered projection data; and producing a filtered image by applying an optimized image domain shrinkage function to the image.

According to some embodiments of the invention, the optimized projection domain shrinkage function includes a parameter array of a smaller dimension than a dimension of the projection data.

According to some embodiments of the invention, the optimized image domain shrinkage function includes a parameter array of a smaller dimension than a dimension of the image.

According to an aspect of some embodiments of the present invention there is provided a projection reconstruction system which produces reconstructed images including a projection data production module for producing projection data; a filtering module for producing filtered projection data by applying a sparsifying transform and an optimized projection domain shrinkage function to the projection data; and an image reconstruction module for producing an image by applying a reconstruction transform to the filtered projection data.

According to an aspect of some embodiments of the present invention there is provided a projection reconstruction system which produces reconstructed images including a projection data production module for producing projection data; a first filtering module for producing filtered projection data by applying a sparsifying transform and an optimized projection domain shrinkage function to the projection data; an image reconstruction module for producing an image by applying a reconstruction transform to the filtered projection data; and a second filtering module for producing a filtered image by applying a sparsifying transform and an image domain shrinkage function to the image.

According to an aspect of some embodiments of the present invention there is provided a system for producing an optimized shrinkage function for a projection reconstruction system including a projection data production module for producing first, target, projection data of a target object and second projection data of the target object; an image reconstruction module for producing a target image by applying a reconstruction transform to the first projection data, and a second restored image by applying a reconstruction transform to the second projection data; a filtering module configured for producing at least one selected from a group consisting of filtered projection domain projection data, by applying a sparsifying transform and a projection domain shrinkage function; and a filtered image domain second image, by applying a sparsifying transform and an image domain shrinkage function; a comparison module for comparing the target image and the second image configured to produce a difference measure; and an optimization module for producing at least one selected from a group consisting of an optimized projection domain shrinkage function; and an optimized image domain shrinkage function, by minimizing the difference measure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings:

FIG. 5A depicts an image of a first reference image, and FIG. 5B depicts sixteen additional images, reconstructed using four methods at four levels of noise;

FIG. 14A is a simplified block diagram illustration of yet another example embodiment of the invention;

FIG. 14B is a simplified block diagram illustration of still another example embodiment of the invention.

DESCRIPTION OF SPECIFIC EMBODIMENTS OF THE INVENTION

Figure 1:
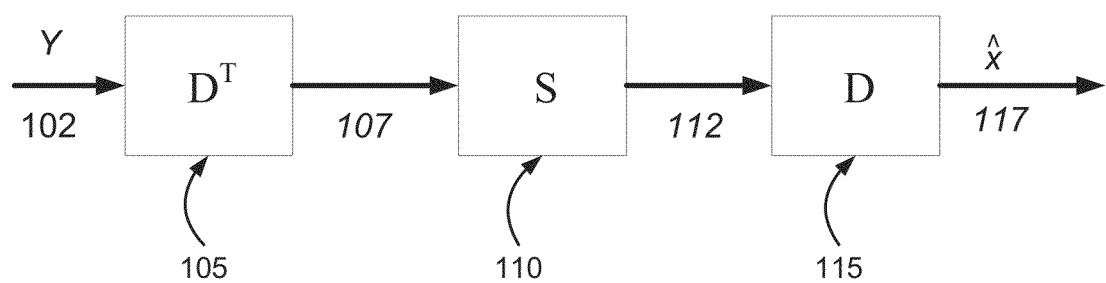
FIG. 1 is a simplified block diagram illustration of a denoising process by shrinkage in a transform domain according to an example embodiment of the present invention.

The present invention, in some embodiments thereof, relates to computed tomography, and, more particularly, but not exclusively, to methods for reconstruction of images from projected data in computed tomography.

In reconstructing computed tomography images according to some embodiments of the invention, the raw data, or sinogram, is in what may be called the transform domain. CT Images are produced from the raw data by applying a learned shrinkage function, and transforming into the image domain.

It is noted that CT images are typically three-dimensional, volumetric images. Example images described herein include two-dimensional images. However, persons skilled in the art will easily recognize when what is described in terms of a two-dimensional image is also applicable to three-dimensional, volumetric, images.

The term "image" in all its grammatical forms is used throughout the present specification and claims where applicable, to stand for both a two-dimensional image and for a volumetric, three-dimensional image.

In some embodiments of the invention, as will be explained further below, the shrinkage function, or filter, has smaller dimensions than a raw image array, such as a 5×5 filter, a 6×6 filter, a 7×7 filter, an 8×8 filter, a 9×9 filter, and so on. The smaller filter potentially reduces the computational load required for applying the filter, and may detract from image improvement.

The present invention, in some embodiments thereof, performs adaptive local processing of measurement data in a transform domain. The terms adaptive and local are now understood, adaptive implying that the filter is adaptive, and local implying that the filter may be applied piece-wise to an area of an array which is smaller than the entire array. CT image reconstruction applying adaptive local processing in the transform domain may be described as "apply-shrinkage-function and transform-to-image-domain".

The present invention, in some embodiments thereof, uses adaptive local processing of measurement data in an image domain. CT image reconstruction applying adaptive local processing in the image domain may be described as "transform-to-image-domain and apply-shrinkage-function".

The present invention, in some embodiments thereof, may use various different reconstruction transforms, such as, by way of a non-limiting example, Filtered Back-Projection (FBP).

The present invention, in some embodiments thereof, uses adaptive local processing of measurement data in both a projection domain and adaptive local processing of image data in an image domain. Filters are optionally trained in both the transform domain and the image domain, as mentioned above and described in more detail below. CT images are produced from raw data in the transform, sinogram, domain, in a process including apply-shrinkage-function→transform→apply-shrinkage-function.

An aspect of some embodiments of the present invention includes the adapting, also termed training, of the above-mentioned filters.

CT images may be produced at high quality by using high X-ray dosage. However, high X-ray dosage is unhealthy for patients. According to some embodiments of the invention, filter training is performed by producing high X-ray dose, high quality, target images of the same objects as used for producing lower, or normal, dose restored images. Optionally, the filters are optimized so as to produce, when participating in an image reconstruction process as described above, images which are close to the target images.

According to some embodiments of the invention, filter training is performed by producing high X-ray dose, high quality, target images of a cadaver, and the same cadaver for producing lower, or normal, dose restored images. It is noted that projecting a high dose through a cadaver is not typically detrimental to the cadaver.

In some embodiments of the invention techniques are used which modify coefficients in a transform domain using a set of scalar mapping functions (MFs). The MFs are also known as shrinkage functions since they commonly apply an adaptive shrinking operation to the transform coefficients.

In some embodiments of the invention, shrinkage functions are trained via an off-line supervised learning procedure to achieve optimal performance on a training set of reference images.

In some embodiments of the present invention, stochastic noise, present in measurements is reduced, based on an assumption that structured bias factors are treated by existing methods. Explicitly, the well accepted compound Poisson-Gaussian statistical model describing the behavior of realistic photon count data [1] [2] is assumed.

Some embodiments of the present invention provide a non-iterative method for image reconstruction which takes into account the above-mentioned statistical model.

In the above-mentioned embodiments, prior to pre-processing, noisy photon counts optionally undergo an adjustment accounting for additive Gaussian noise, and optionally undergo a transformation normalizing noise variance. The data is then processed according to a learned shrinkage function in a sparsifying transform domain, such, by way of a non-limiting example, a Discrete Cosines Transform (DCT) domain. A CT image is then reconstructed, for example using a filtered-back-projection (FBP) operator with a Ram-Lak filter (for example see [16]). The obtained image is optionally processed by another instance of learned shrinkage, trained in the image domain.

In some embodiments, the sparsifying transform is an Undecimated Wavelet Transform with a Haar basis.

In the above-mentioned embodiments, an example training objective function, optionally for both sparsifying transform (e.g. DCT) domain and image domain processing, is a Mean Square Error (MSE) function of the reconstructed images with reference to reference high-quality images, summarized over a training set.

The above-mentioned method contrasts with typical optimization-based reconstruction methods, where an objective function consists of a data fidelity term, which is not directly related to the produced image, and a prior term which promotes some properties, like piece-wise smoothness, of the image. A fidelity term of an objective function is hereby used to mean a component of a function used to enforce consistency with measurements. A prior term of an objective function is hereby used to mean a component of a function which penalizes deviation of an output image from properties which the image should possess, for example according judgment by an algorithm designer.

The present invention, in some embodiments thereof, uses a more general version of an algorithm for learned shrinkage than proposed in [15].

In some embodiments of the present invention, a synthesis transform, for example a linear operator transforming the DCT representation of the signal back to a form of measurement data, is also learned along with the shrinkage maps.

In some embodiments of the present invention, the reference images for such training is optionally obtained from a high dose scan of a human cadaver, and the corresponding degraded low-dose measurement data is acquired in a repeated scan with a different protocol. In the high-dose scan, electronic noise becomes negligible relative to the high photon counts, so high-quality images are obtained.

In some embodiments of the present invention, the training set is composed of carefully chosen images, representing a specific anatomical region. In principle, different regions have different image statistics and therefore, in some embodiments, are optionally trained separately, and optionally an operator chooses a relevant version of a training scheme, similar to present use of different smoothing filters for standard FBP.

Simulations suggest that in practice CT image reconstruction according to an embodiment of the invention is robust to choice of anatomic region for the training set.

In some embodiments of the present invention, the method used optionally accounts for the statistical model used by the iterative algorithms, optionally by noise normalization. A relatively heavier iterative learning procedure is optionally performed once, optionally off-line, while the processing of new data is of a computational complexity matching that of a standard FBP method. The above-mentioned lightening of the computational load provides a capability to bridge a gap between a slow, high-quality, statistical algorithm and a fast and crude linear reconstruction.

In some embodiments of the present invention the learning method has a potential to adjust to additional, optionally unknown, degradation factors, and/or to adjust to hardware specifications.

Numerical experiments made with reference to some embodiments of the invention show that the outcome is a robust processing tool, which outperforms an optimally tuned FBP reconstruction, both in a sense of the visual perception of the resulting CT images and in terms of SNR, and is comparable to an iterative PWLS reconstruction. An example improvement of 3.5 dB in the SNR was measured during some experiments.

The above-mentioned achieved improvements, by embodiments of the invention, are quantified by a number of measures—Signal-to-Noise Ratio, noise variance and spatial resolution.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is made to a description of noise reduction with learned shrinkage in the transform domain.

Consider a linear inverse problem of recovering a signal x from measurements y of form $$y = Hx + \xi;\qquad \text{Equation 1}$$

where H denotes a linear transformation and $\xi$ denotes a noise of some sort. A popular Bayesian approach for signal recovery consists of solving the Penalized Least Squares (PLS) optimization problem $$\hat{\alpha} = \arg\min_\alpha \|y - HD\alpha\|_2^2 + \lambda \rho(\alpha)\qquad \text{Equation 2}$$

and setting $\hat{x} = D\hat{\alpha}$, that is, the signal is encoded in the domain of some chosen transform D. The left summand of Equation 2 is a data fidelity term, and the right summand (called the prior) expresses the assumed statistical model of the signal's coefficients.

A classical assumption of rapid decay of the coefficients corresponds to the penalty $\rho(\alpha) = \|\alpha\|_p^p + \lambda \rho(\alpha)$ with $0 \le p \le 1$ [17]. For a pure de-noising problem (H=I) and a unitary transform D, Equation 2 is separable and admits a closed-form solution, which is described by a scalar shrinkage function applied to the coefficients. The solution is derived analytically from the expression for $\rho(\alpha)$ [18], [19], [20]. Noise reduction is performed by decreasing (shrinking) values of small-magnitude coefficients, which usually represent noise, in light of an assumption of rapid decay. The de-noising action includes computing $\hat{x} = DS(D^T y)$, as described with reference to FIG. 1.

Reference is now made to FIG. 1, which is a simplified block diagram illustration of a de-noising process according to an example embodiment of the present invention.

FIG. 1 depicts a signal y 102 input into a first unit 105 for applying a transform $D^T$, producing an output 107. The output 107 is input into a second unit 110 which applies a transform S that performs element-wise shrinkage, producing an output 112. The output 112 is input into a third unit 115 which applies a transform D, producing an output $\hat{x}$ 117, see D. Donoho and I. Johnston [21], which is incorporated herein by reference.

In some embodiments of the invention the transform $D^T$ is an inverse of unitary transform D.

The above de-noising process may be applied in a broader context of non-unitary and/or even non-square tight frames (see [15], [20] for an overview), where the scalar shrinkage operation provides only an approximate solution to Equation (2).

A practical approach for case when the Equation (2) is non-separable is optionally used in embodiments of the present invention: the shrinkage functions are learned in an example-based process, where an objective function is optionally optimized with respect to defining parameters of the shrinkage functions.

In some embodiment, an objective function involves a set of reference signals $\{x^j\}$ and corresponding noisy measurements $\{y^j\}$:

$$\hat{p} = \mathrm{argmin}_p \sum_1^N \|DS_p(D^T y^j) - x^j\|_2^2 \qquad \text{Equation 3}$$

Where $S_p$ stands for an array of scalar shrinkage functions, applied element-wise to the representations $D^T y_j$ of the data.

In some embodiments of the invention, effective learning is achieved by encoding the shrinkage functions as linear combinations of order-one splines (i.e., piecewise linear functions).

In some embodiments of the invention, the shrinkage functions are determined by a set of parameters p, which is tuned to minimize the objective value. In the embodiments, when the signal is too large to be transformed as a whole, the above method is applied locally to small overlapping patches from each $y^j$.

In some embodiments of the invention, the use of custom-built functions makes the shrinkage operation more robust, and suitable for signal processing problems other than noise reduction. For example, an algorithm for single image super-resolution, based on the same principles, exhibits a state-of-the-art performance [22].

In some embodiments of the invention, the learned shrinkage algorithm is implemented according to the method suggested by Hel-Or and Shaked [15], with implementation specific details.

The learned shrinkage algorithm includes applying an array Sp of learned scalar shrinkage functions to representations α of small patches, optionally squares, of a noisy 2-D signal in a domain of a chosen transform D. The patches optionally overlap, which is optionally used to avoid block artifacts and potentially stabilizes the processing action. In some embodiments, each pixel is altered differently in each patch it belongs to; drastic changes are tamed by averaging over all those patches.

A patch p of size d×d corresponding to location k in a data matrix of y is extracted by a linear operator $p=E_k^y$ and is re-installed into a signal-sized empty matrix by its transpose $E_k^T$. A patch-wise denoising action for a 2-D signal is described by $$\hat{x} = M_E^{-1} \sum_{k=1}^{K} E_k DS_p(D^T E_k y) \qquad \text{Equation 4}$$

In Equation 4 above, the form $M_E = \Sigma_k E_k^* E_k$ compensates for overlapping by dividing each pixel by the number of contributing patches, generally $d^2$.

Different representations of d×d patches, transformed with a unitary 2-D sparsifying transform, such as a DCT, have $d^2$ coefficients, show different dynamic range and behavior.

In some embodiments of the invention, a dedicated shrinkage function is optionally allocated to each of these coefficients, applying an array $Sp=[S_1, \ldots, S_{d^2}]$ to each representation. In the above-mentioned embodiments $p=[p_1, \ldots, p_{d^2}]$ is a set of defining parameters for the shrinkage function. The parameters are paired with vectors $q=[q_1, \ldots, q_{d^2}]$ which cover a dynamic range of the coefficients; each $S_i$ is an anti-symmetric piecewise linear function determined by the equations $q_i, p_i$ $$S_i(q_i(j))=p_i(j), S_i(-q_i(j))=-p_i(j), \forall j \qquad \text{Equation 5}$$

$S(0)=0$

The anti-symmetry is introduced so that only absolute values of the coefficients affect the amount of shrinkage applied.

Denote by $\alpha_k=(D^T E_k^y)$ the representation of a k-th patch in the noisy signal. A shrinkage function $S_i$ acts on its i-th element; when applying an array $S_p$ of the shrinkage function to $\alpha_k$ each coefficient is processed by a corresponding function. Hel-Or and Shaked define a slice transform (SLT) which is applied to the data $\alpha_k$ in order to express a shrinkage operation as a linear function in p. In some embodiments, a large sparse matrix $Uq,\alpha_k$ encoding the data is produced (see [15], and below, where reference is made to training the reconstruction chain) to perform the shrinkage via a matrix-vector product:

$$U_{q,\alpha_k} q = \alpha_k, U_{q,\alpha_k} \cdot p = S_p(\alpha_k) \qquad \text{Equation 6}$$

The transform of Equation 6 enables expressing the objective function as a simple quadratic function in p. A least squares problem is obtained:

$$\hat{p} = \underset{p}{\text{argmin}} \left\| M_E^{-1} \sum_{k=1}^{K} E_k DS_p(\alpha_k) - y \right\|_2^2 = $$

$$= \underset{p}{\text{argmin}} \left\| M_E^{-1} \sum_{k=1}^{K} E_k D^T U_{q,\alpha_k} \cdot p - y \right\|_2^2, \qquad \text{Equation 7}$$

$$\alpha_k = D^T E_k y$$

which is solved for p using the pseudo-inverse.

In some embodiments of the invention, an additional degree of freedom is introduced into the above-described method. Optionally, the transformation $D^T$ is rendered as an analysis operator Ψ, leading to a representation α=Ψx of a signal x. The transformation D is called herein a synthesis operator Φ, which recovers the signal $\tilde{x}=\Phi\alpha$ from a representation. Whenever $\Psi=\Phi^+$, and Ψ is full rank, the shrinkage scheme has a property that, with the identity shrinkage functions, the signal x is not altered. However, the above property is not a necessary condition. In some embodiments of the invention a synthesis operator—and an analysis operator are used where the one is not a pseudo-inverse of the other, when better shrinkage results are obtained.

Equation 7 may be replaced with $$\{\hat{p}, \hat{\Phi}\} = \underset{p,\Phi}{\text{argmin}} \left\| M_E^{-1} \sum_{k=1}^{K} E_k \Phi S_p(\alpha_k) - y \right\|_2^2 \qquad \text{Equation 8}$$

A synthesis operator is initialized with a selected linear transform D and is trained along with shrinkage functions. A potential benefit of this change is that the shrinkage produces a change in the coefficients, which potentially alter their interpretation; a different synthesis operator can potentially produce a signal better satisfying a final objective function. Optionally, the above step helps reducing the value of the objective by a non-negligible amount.

A stated objective expression is optionally a quadratic function both in p, as explained above, and in Φ. To solve the above optimization problem, we optionally use a block-coordinate descent, optimizing for each of the two parameters p and Φ in turn. The process produces a monotonically descending objective value.

It is noted that the analysis operator Ψ can be trained in addition to, or instead of, the synthesis operator Φ.

It is noted that training the analysis operator Ψ is not described separately here, in order to keep the description simpler, and reduce the number of changeable parameters in a method according to some embodiments of the invention.

It is noted that training the analysis operator V has produced only a small improvement in some simulations.

Reference is made to an embodiment of the invention in more detail.

Using notation as described above, and the assumed statistical noise model for a CT scan, a reconstruction chain is described and elaborated on with reference to involved operators.

A. Mathematical Model of a CT Scan

A mathematical model described is of a two-dimensional, parallel beam scan geometry, in which a scanned object provides a 2-D attenuation map, an example of which may be an axial slice of a patient's body. During a scan, a rotating gantry optionally sweeps an angular range of $[0, \pi]$, normally equally divided into a large number of projections, or views. For each angle θ, a one-dimensional array of detectors count received photons, which arrive, by assumption, in parallel beams. It is noted that a practical fan-beam geometry can be transformed to a parallel-beam setup via a re-binning step. Acquired data is arranged into a 2-D matrix, which columns optionally correspond to angles and rows are optionally assigned to bins in each projection. Herein, for clarity of description, we refer to a general straight line l through a scanned object, defined by a specific projection and the bin in the projection.

Noise contaminating the photon counts is described using a compound Poisson-Gaussian statistical model [1], [2], which is also empirically verified in [9]. Each measured photon count $y_l$ is optionally rendered as an instance of a random variable $Y_l$ following the distribution $$Y_l \sim \text{Poiss}(\lambda_l) + \text{Gauss}(d, \sigma_n),$$

$$\lambda_l = I_0 \cdot \exp(-[Rf]_l) \quad \text{Equation 9}$$

where R is the Radon transform of the scanned image f and the constant $I_0$ is the photon count at the source. For each straight line l corresponding to an angle θ with x-axis and distance s from the origin, the Radon transform is defined by $$[Rf]_l = \int_{t \in R} f(s \cdot \cos(\theta) - t \cdot \sin(\theta), s \cdot \sin(\theta) + t \cdot \cos(\theta)) dt \quad \text{Equation 10}$$

Log-transformed photon counts $g_l = -\log(y_l/I_0)$ are approximate line integrals; a corresponding data matrix g is termed a sinogram since points in the image space trace a sine curve in the projection domain. The sinogram defined here corresponds to the definition above of a sinogram as raw data obtained by a CT projection-reconstruction system and log-transformed.

B. A Reconstruction Chain

Processing of measurement data (photon count) is processed is now described, and following subsections elaborate on the processing.

Data adjustment for signal processing: the photon counts are optionally altered so as to allow approximate modeling with only the Poisson random variable; then they optionally undergo an Anscombe transform to normalize noise variance.

Learned Shrinkage applied to the measurements (operator $S^M$): the adjusted measurements are processed patch-wise using an extension of the learned shrinkage algorithm described above.

Filtered Back Projection (FBP) (operator T): An FBP reconstruction, optionally with a non-apodized Ram-Lak filter reconstructs the image from the restored measurement data.

Learned Shrinkage optionally applied to the image (operator $S^I$): an optionally different instance of a learned shrinkage algorithm trained for a post-processing step.

C. Adjusted Measurements

The measured photon counts are considered as following the distribution described by Equation 9. Adjusted variables are computed as described in [1]

$$\hat{y}_l = [y_l - d + \sigma_n^2]_+$$

where $[x]_+ = \max\{x, 0\}$. It is noted that the expectation and the variance of this distribution matches those of the single Poisson variable with the parameter $\hat{\lambda}_l = \lambda_l + \sigma_n^2$. For the purposes of noise normalization, the above is the distribution modeling the adjusted measurements $\hat{y}_l$.

In some embodiments of the invention a zero-mean electronic noise (d=0) is used, and the positivity correction $\sigma_n^2$ is not relevant.

The variance of a Poisson random variable with a parameter $\hat{\lambda}_l$ is $\hat{\lambda}_l$ itself; it is well approximated by the measured photon count $\hat{y}_l$. The noise reduction by learned shrinkage typically works best when the noise is homogeneous. In order to achieve unit variance at all the measurements for de-noising, an Anscombe transform [23]

$$A(x) = 2\sqrt{x + 3/8}$$

is optionally used. The transform is optionally derived using a first-order approximation of the standard deviation for a function $f(x)$ of a random variable $x: \sigma_{f(x)} \approx f'(x) \sigma_x$. In the above case, $x \sim \text{Poisson}(\lambda)$, the function $f(x)$ satisfying $f'(x) \sigma_x = \text{const}$ is just the Anscombe transform, (up to the constant of 3/8 which stems from specific considerations). The Anscombe transform is described in more detail in above-mentioned reference [23], "The transformation of Poisson, binomial and negative binomial data", the disclosure of which is hereby incorporated herein by reference.

The function $\Omega(x) = A(x + \sigma_n^2)$ denotes the overall data adjustment. Transformed data is denoted by $\bar{y}$ $$\bar{y}_l = \Omega(y_l) = A(y_l + \sigma_n^2)$$

D. Filtered Back-Projection

The FBP transform is defined by $T = R^* F$, where $R^*$ is the back-projection transform, optionally the adjoint of the Radon transform, and F is a 1-D convolution filter applied to individual projections in the projection domain. Optionally, the convolution filter employs the Ram-Lak kernel [16].

In some embodiments of the invention, low-pass filtering is employed to reduce the high-frequency noise amplified by the Ram-Lak kernel. The parameters of the low-pass filter, implemented, for example, as a Butterworth of a Shepp-Logan window applied in the frequency domain, are usually different from one anatomical region to another, and their values are typically kept fixed in clinical CT scanners.

It is noted that system performance depends on the above apodization parameters [24].

In some embodiments of the invention, the FBP is used without a low-pass filter, since the noise reduction is done by the shrinkage tool.

E. Training Objective for Pre-Processing Learned Shrinkage

It is desirable in a training mode to have possession of an ideal measurement set $\lambda = \{\lambda_l\}$, of true photon counts, and a corresponding realistic degraded set $y = \{y_l\}$ where l sweeps over all the lines through the object where measurements were taken. A naive application of a learned shrinkage technique includes setting an objective function in terms of an error in the domain of photon counts:

$$\{p, \Phi\} = \underset{p, \Phi}{\arg\min} \|\Omega^{-1}(S_p(\bar{y})) - \lambda\|_2^2 \quad \text{Equation 11}$$

where $$S_p(\bar{y}) = M_E^{-1} \sum_{i=1}^{d^2} E_k \Phi S_p(\Psi E_k \bar{y})$$

The learning objective leads to a reduced Mean Square Error (MSE) in the processed measurement data, and, effectively, in a reconstructed image computed by $$\bar{f} = T\left(-\log\left(\frac{1}{I_0}\Omega^{-1}S_p(\bar{y})\right)\right) \quad \text{Equation 12}$$

In some embodiments of the invention, MSE is not considered an adequate measure for the noise level in the domain of photon counts: high photon count values contain little noise and can be larger by 2-3 orders of magnitude than low photon counts, which is where most of the noise is concentrated. The squared difference between the ideal measurements $\lambda_I$ and the degraded realistic counts $y_I$ is mostly influenced by clean data, and minimizing the squared difference value causes little noise reduction. The measurements optionally undergo a log transform, since in the projection domain noise energy is adequately described by the MSE.

In some embodiments of the invention a regularization term is optionally added, which controls deviation of the shrinkage functions from identity. The regularization term stabilizes the shape of the obtained shrinkage functions, making the shrinkage functions robust to data outliers. The objective function takes the form $$\{p, \Phi\} = \quad \text{Equation 13}$$
$$\operatorname*{argmin}_{p,\Phi}\left\|-\log\left(\frac{1}{I_0}\Omega^{-1}(S_p(\bar{y})) + \log\left(\frac{1}{I_0}\lambda\right)\right)\right\|_2^2 + \gamma_p\|p - q\|_2^2$$

With an $S_p$ operator as defined in Equation 11.

When a learned shrinkage tool is trained with this objective, a sinogram restoration algorithm is obtained, which operates without dependence on the reconstruction transform, and aims for a minimal MSE in the resulting sinogram data.

The above approach optionally provides benefits when a radiologist is interested in sinogram data. For a fixed projection angle, when the sinogram data in all the axial slices is stacked in rows, an obtained matrix is just a standard X-ray image of the patient; so sinogram data has value of its own. However, if the final goal of the radiologist is a CT image, such a learning procedure is suboptimal. At least one reason is that the Radon transform is ill-conditioned, especially in its discretized version, and the inverse of the Radon transform is only approximately represented by T.

In some embodiments of the invention the objective function is stated in terms of the error in the image domain, rather than the measurement domain. The objective function involves a reference image $$f = T\left(-\log\left(\frac{1}{I_0}\lambda\right)\right);$$

$$\{p, \Phi^M\} = \quad \text{Equation 14}$$
$$\operatorname*{argmin}_{p,\Phi^M}\left\|T\left(-\log\left(\frac{1}{I_0}\Omega^{-1}S_p^M(\bar{y})\right)\right) - f\right\|_2^2 + \gamma_p\|p - q\|_2^2$$

where $$s_p^M(\bar{y}) = M_E^{-1}\sum_{i=1}^{d^2} E_k\Phi S_p^M(\Psi E_k\bar{y})$$

The upper script $^M$ is used to denote parameters of the learned shrinkage tool used for measurements processing; similarly, the upper script $^I$ denotes another instance of the learned shrinkage tool used for post-processing the image in the image domain.

When the above training objective is used, the parameters of the learned shrinkage operator $S_r$ are tuned not only to reduce photon count noise in measured data y through the processing of adjusted data $\bar{y}$, but also to prepare data for a specific reconstruction operator T (we use the FBP transform for T). Here lies a difference between a method according to an example embodiment of the invention and existing sinogram restoration methods, which aim to produce a high quality signal in the measurement domain rather than aiming to produce a high quality image.

A potential problem with measuring noise in a reconstructed image using MSE is that a blurred image may have lower MSE than a sharp image.

A basic calculation of MSE may be calculated as follows:

$$\varphi_1(\tilde{f}) = \sum_x (f(x) - \tilde{f}(x))^2 = \|f - \tilde{f}\|_2^2$$

Where f is a reference image and $\tilde{f}$ is the reconstructed image.

In some embodiments the differences between the restored image and the target image are measured by calculating a faint-edge-promoting error calculation between the restored image and the target image.

In some embodiments the above MSE calculation is enhanced by a sharpness-promoting penalty, which ensures that a gradient norm in $\tilde{f}$ should not fall below the gradient norm in f. The sharpness-promoting error calculation is calculated as follows:

$$\phi_2(\tilde{f}) = \|f - \tilde{f}\|_2^2 + \mu(J - \tilde{J})_+$$

where: $J = \|\nabla_x f\|_2^2$, $\tilde{J} = \|\nabla_x \tilde{f}\|_2^2$

In some embodiments error measurement is restricted to regions of interest in the reconstructed image.

In some embodiments enhancing the error measurement using the above-described gradient-based component is restricted to relatively sharp, fine edges in the reference image and/or in the reconstructed image. In some embodiments the restriction is optionally performed as follows: a weight map W the size of the image is computed; the weight map W is optionally a binary mask used to remove locations where a reference gradient norm is above 2% of its maximal value. The weight map is then multiplied element-wise by a penalty component from the formula above.

In some embodiments the non-negativity function ( )$_+$ used in the above-described gradient-based component is smoothed for better optimization.

The expressions above describe one reference image and corresponding measurements. In some embodiments of the invention, the MSE in the reconstructed image is summarized over the training set of representative images for training. The training procedure is discussed further below.

F. Image Post-Processing with Learned Shrinkage

The pre-processing and reconstruction operators are learned, and provide a method which produces CT images of good quality. Experimental results are provided below which substantiate the above statement.

In some embodiments of the invention, a further reduction of noise and streaks is used, providing additions to an adaptive image processing tool. Remaining noise statistics in CT images obtained after applying the adaptive tools described above is not known. However, learned shrinkage in the image domain can potentially succeed in reducing the remaining noise because of its adaptive properties, demonstrated in [15], [22].

A synthesis/analysis pair for the transform domain is denoted by $\Phi^I$, $\Psi^I$ correspondingly, and a parameter set for the learned shrinkage functions is denoted by r. An input image $\hat{f}$ is optionally computed via Equation 12 with the parameters $\kappa$, p, $\Phi^M$ learned earlier.

Post-processing is done by $$S_r^I(\bar{f}) = M_E^{-1} \sum_{k=1}^{K} E_k^T \Phi^I S_r(\Psi^I E_k(\bar{f}))$$ Equation 15

The operators $\{E_k\}$ and the corresponding compensation matrix $M_E$ act in the image domain, but otherwise are defined similarly to Equation 4.

As previously, the training of r, $\Phi^I$ includes solving the optimization problem reducing the $L_2$ norm of the reconstruction error: for a single reference image f, it is stated as $$\{r, \Phi^I\} = \underset{r, \Phi^I}{\operatorname{argmin}} \left\| S_r^I(\hat{f}) - f \right\|_2^2 + \gamma_r \|r - q\|_2^2$$ Equation 16

In some embodiments of the invention the error is summarized over the training set, as described above with reference to previous cases.

It is noted that the post-processing method should be evaluated in its own right, when the corrupted input images may come from the standard FBP or from any other reconstruction method with any pre-processing techniques.

Optimizing Shrinkage Filters for Raw-Data and Image Processing.

In some embodiments, once $S_r^I(f)$ of Equation 15 is trained as an image-domain filter, a raw-data domain filter is updated by minimizing the following objective function:

$$\{p, \Phi^M\} = \underset{p, \Phi^M}{\operatorname{arg\,min}} \| S_r^I(T(-\log(\Omega^{-1} S_P^M(\bar{y})))) - f \|_2^2 + \mu (J - \tilde{J})_+$$

where $J = \|\nabla_x f\|_2^2$, $\tilde{J} = \|\nabla_x \tilde{f}\|_2^2$ and $\tilde{f} = S_r^I(T(-\log(\Omega^{-1} S_P^M(\bar{y}))))$ and $S_p^M(\bar{y})$ is defined in Equation 14 above.

The parameters of the raw-data filter are trained for minimal error with a fixed post-processing stage. In order to solve the above equation using the non-linear 1-BFGS optimization, a gradient of the objective function with respect to p, $\Phi^M$ is computed.

G. Computational Complexity of the Above Method

The number of operations required for image reconstruction with the above method is $O(n^3)$, which is the same computational complexity as required by FBP alone.

The measurement matrix includes $2n \times \sqrt{2} \cdot n \approx 2.82 n^2$ elements.

The learned shrinkage function is applied to the measurements by executing the analysis operator patch-wise. A 2-D DCT including 49 basis functions of size 7×7 is optionally used. The batch transformation of all the patches is optionally executed by convolving the data matrix with each of these basis functions. Each such convolution takes $2*49*2.82n^2$ operations. Overall, $2*49^2*2.82n^2=1350n^2$ flops are used. For a standard CT dimension of n=512 the above number is order of $n^3$.

The scalar shrinkage is performed with $O(50*n^2)$ operations, since the number of DCT coefficients has a factor 49 of redundancy.

The synthesis operator is computed similarly to the analysis operator and therefore also requires $O(n^3)$ flops.

After pre-processing, and the scalar element-wise Anscombe transform, which requires $O(n^2)$ computations, a standard FBP is optionally applied, requiring $O(n^3)$ flops.

In the image domain, post-processing shrinkage requires a similar amount of computation as in the measurements domain, except for a lack of the 2.82 factor.

Overall, the computational complexity of the method, without off-line training, is $O(n^3)$ flops.

In some embodiments of the invention, the steps in the pre- and/or post-processing are naturally parallelized, up to factor of 49, so the practical reconstruction time is optionally reduced by using multiple cores.

Reference is made to training the reconstruction chain.

In the method described above three consecutive learnable tools are optionally applied during image reconstruction. The properties of the method depend on good choice of a training set and on good design of the learning procedure.

A. Setup for Supervised Learning

In some embodiments of the invention, the design of proposed objective functions includes training with a set Ftr of optimal reference images, along with a corresponding typically-degraded set of measurements.

For reliable human image reconstruction, the training set is optionally composed of clinical images obtained via CT scans of a human body, rather than of synthetic phantoms.

In some embodiments, image pairs are produced: one image with a very high X-ray dose, producing a high-quality reference image, and one image with a low dose desired for a practical CT scan as executed on patients.

In some embodiments of the invention the training data is obtained by scanning human cadavers: there is no restriction on the X-ray dosage and, in our experience with a clinical scanner, there is usually no problem of registration between two consecutive scans, one with the high dose and one with the low dose, for a still object such as a cadaver.

Since the training procedure may be only carried out once, usually when setting up the scanner software, the above-proposed harvesting of training data is plausible for practical use.

B. A Training Set

In clinical CT scanners there is a flexibility in setting up a scan protocol, which defines, amongst others: range of movement; intensity of the X-ray source; choice of FBP filters; post-processing methods; and so on.

Usually different anatomical regions, as well as different diagnostic needs, impose their requirements on image resolution in z-axis and on quality of axial slices, as controlled by the X-ray dose.

In some embodiments of the invention, reconstruction of a chosen anatomic region with the above-described methods optionally uses a set of parameters learned with a training set from the same anatomic region.

It is noted that simulations have shown that an obtained reconstruction chain is quite robust with respect to different anatomic regions, and in some embodiments of the invention it suffices to make the same principal differentiation of scanned areas, such as head, lungs, abdomen, bones, soft tissues, as used for the FBP.

A training set Ftr used in implementing examples described below for a specific anatomic region includes a sequence of axial slices from the region, uniformly distributed within the region. The region is well-represented and principal different forms of axial views of the region are included.

In embodiments of the invention a size of a training set, in term of a number of the above-mentioned image pairs, is a parameter to be taken into account.

The examples described below have shown that we found that 9-12 image pairs suffice for a stable optimization and a consecutive robust reconstruction.

In some embodiments of the invention 5 or 6 image pairs suffice for a stable optimization and a consecutive robust reconstruction.

It is noted that the number of image pairs depends on the anatomical region and on a choice of images.

C. An Example Training Procedure

A summary is now provided of an example embodiment of an off-line supervised-learning procedure, for tuning learnable parameters of the proposed method. The parameters of the data-processing steps are obtained via a minimization of corresponding objective functions, as stated in Equations 14 and 15. In both Equations a similar quantity is minimized—a reconstruction error with reference to a reference image. The minimization is of the joint objective function $$\Delta(p, \Phi^M, r, \Phi^I) == \sum_{f \in Ftr} \left\| S^I_{(r,\Phi^I)} T\left(-\log\left(\frac{1}{I_0} \Omega^{-1} S^M_{(p,\Phi_M)} \bar{y}\right)\right) - f \right\|^2_{2,Q}$$

Equation 17

It may be difficult to find a global minimum of the error function of Equation 17, due to a complex structure of its set of variables. In some embodiments of the invention a block-coordinate descent is used to find the minimum. Optionally, at each update step, three out of the four parameters of Equation 17 is fixed and one of the parameters is computed to find a minimum of the objective function.

An update scheme reflects the interdependence of the various parameters: the two parameters p and $\Phi^M$ defining a first shrinkage operator are trained in turns optionally until stability of the objective value is obtained. Reaching stability of the objective value is optionally determined by setting a threshold below which a change between successive objective values must be for stability to be declared, or setting a threshold for a gradient of a function describing the change of objective values over the iterations.

Optionally, at a second stage of training (defined herein as stage-II), the parameters r and $\Phi^I$ of a post-processing operator $S^I$ are learned. The learning data at the second stage includes images reconstructed with FBP from pre-processed measurements, provided along with high quality, high radiation, reference images. It is noted that, as defined herein, Stage-II is performed in the image domain, whilst stage-I is performed in the raw data domain, or the domain of adjusted raw data. Again, the two parameters are tuned in turns, until the objective value is stable, upon which training is optionally stopped.

In some embodiments of the invention, it was found that it took 6 turns among the two parameters to reach stabilization, where in each turn a full optimization for one of the parameters was performed.

Reference is made to results of an example empirical study.

Numerical simulations designed to study properties of example embodiments of the invention and to compare the embodiments to other methods of CT image reconstruction are described below. Both visual comparisons and quantitative measures of performance are presented.

A. Experimental Setup

An example embodiment of the invention was implemented in a Matlab environment and tested on sets of clinical CT images. The clinical CT images represent axial slices extracted from a 3D CT scans of a male and a female, in two anatomical regions of abdomen and thighs. The images are courtesy of the Visible Human Project (see wwwdotnlmdotnihdotgov/research/visible/visiblehumandothtml). The CT scan in this project produced 512×512 slices with 1 mm intervals for the male and 0.33 mm intervals for the female. Intensity levels correspond to Hounsfield Units (HU), pixel depth of 12 bits. The scanner model and scan protocol are not specified in the Visible Human Project description.

Figure 2:
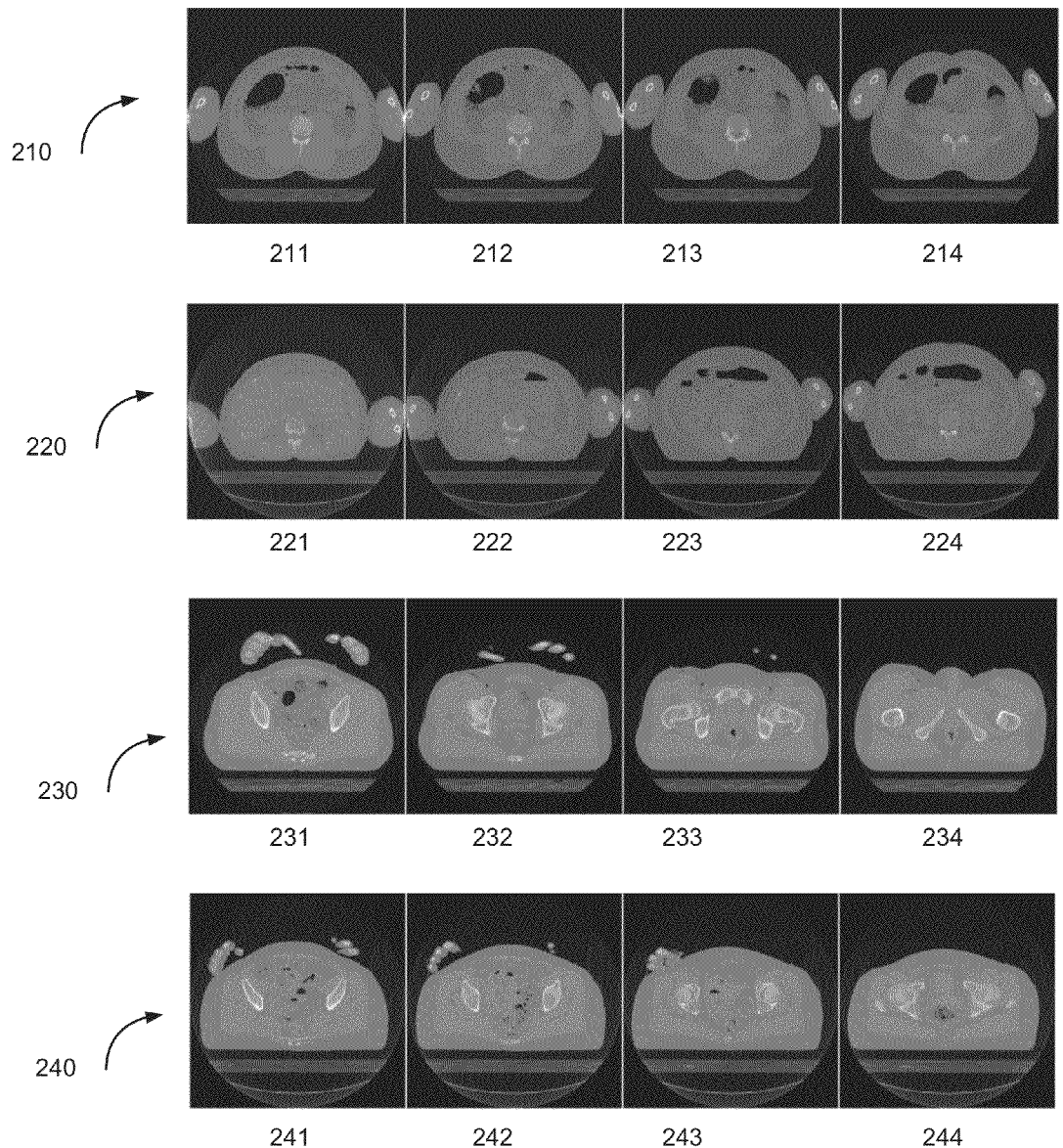
FIG. 2 is a set of representative clinical images used to simulate implementations of methods according to example embodiments of the present invention.

Reference is now made to FIG. 2, which is a set of representative clinical images used to simulate implementations of methods according to example embodiments of the present invention.

FIG. 2 depicts, from top row to bottom row:

a first row 210 including four images 211 212 213 214 of the male abdomen;

a second row 220 including four images 221 222 223 224 of the female abdomen;

a third row 230 including four images 231 232 233 234 of the male thighs; and a fourth row 240 including four images 241 242 243 244 of the female thighs.

The images are examples of different anatomical slices.

It is noted that the representative images used for the training stage are not perfect, since they were obtained using a standard X-ray dosage. If high-quality high-dosage images were available for training, methods implementing the present invention are expected to perform even better than described below.

In absence of raw measurement data from the CT scanner, the scan process was simulated, computing projections of given CT images, considered to be ground truth data, as follows:

First, the images are converted from the Hounsfield Units (HU) to those of linear attenuation coefficient μ, by the formula:

$$HU(x) = \frac{\mu(x) - \mu(\text{water})}{\mu(\text{water}) - \mu(\text{air})} \cdot 1000$$

where μ(water)=0.19 cm$^{-1}$, and μ(air)=0.

A noiseless sinogram $\bar{g}$=Rf is simulated by applying a pixel-driven implementation of the discrete 2-D Radon transform to the reference image.

True photon counts are computed from the sinogram via the relation $\lambda_f = I_0 e^{-\bar{g}_f}$.

For n×n images, 2n views are used with √2*n bins per view. The original 512×512 images are resized to 305×305 using cubic spline interpolation.

A battery of tests described herein is executed for the above image size.

Photon count noise is simulated by drawing an instance of the compound Poisson-Gaussian random variable $Y_l \sim \text{Poiss}(\lambda_l) + \text{Gauss}(0, \sigma_n)$ for each true photon count. An X-ray dose is controlled by a maximal photon count $I_0$ and a white noise power $\sigma_n$.

The parameters used for both abdomen and thigh regions, according to an example embodiment of the invention, are as follows:

The shrinkage tool is implemented using a sparsifying transform, in this case the 2-D Discrete Cosine Transform (DCT) (see FIG. 4) as an initial synthesis transform $\Phi$ and its transpose as the analysis transform Psi. 7×7 basis functions are used to represent the discrete cosines. It is noted that the 7×7 size was experimentally found to be optimal for the image quality. Each of the 49 corresponding shrinkage functions of the operator $S_r^M$ includes 2×15 linear pieces. The 2×15 number, similar to a value used in [15], was established empirically to produce a sufficiently fine partition of the dynamic ranges. Some graphs of the obtained functions are displayed in FIG. 3.

It is noted that in some embodiments, it was found that quality of resultant images deteriorated below a size of 7×7.

Figure 3:
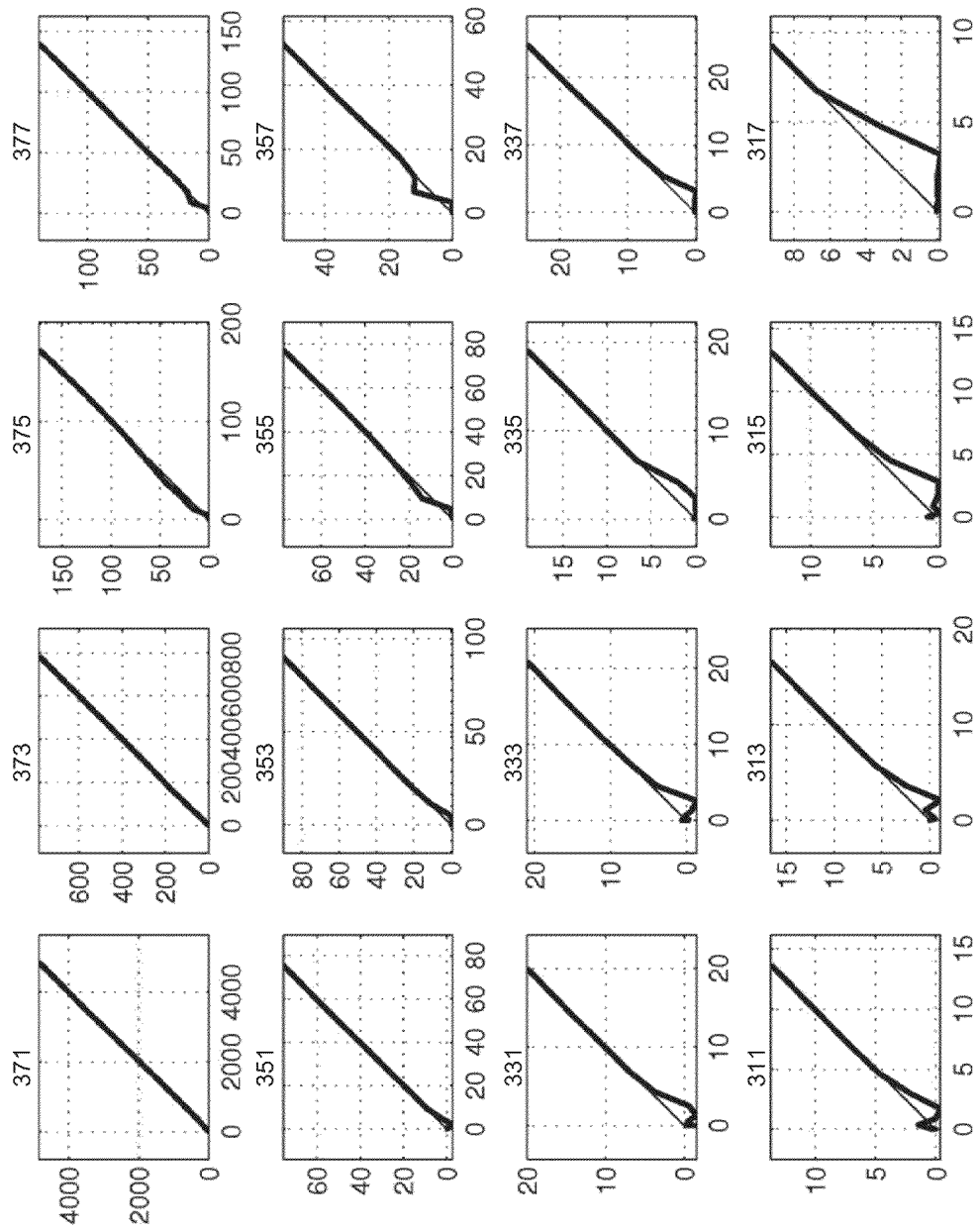
FIG. 3 depicts a set of shrinkage functions obtained via a learning process performed according to an example embodiment of the invention.

Reference is now made to FIG. 3, which depicts a set of shrinkage functions 311 313 315 317 331 333 335 337 351 353 355 357 371 373 375 377 obtained via a learning process performed according to an example embodiment of the invention. Each of the shrinkage functions 311 313 315 317 331 333 335 337 351 353 355 357 371 373 375 377 is depicted with a qualitative X-axis and Y-axis scaled according to a dynamic range of their specific representation coefficient. The shrinkage functions 311 313 315 317 331 333 335 337 351 353 355 357 371 373 375 377 were obtained on a training set including male thighs images. Only odd rows and columns from an original 7×7 array of functions are displayed, due to space considerations. Due to symmetry about the x-axis, only the graphs for the positive half of x-axis are drawn.

The synthesis transform $\Phi^t$ for a second step of processing was set to an initial choice—a 2D-DCT—and was not trained. It is noted that a sufficiently strong noise reduction is obtained by training the shrinkage functions alone. When the objective function is reduced further via dictionary training (as described above with reference to Equation 16), visual perception of a reconstructed image deteriorates because of an introduced blur, despite an apparent improvement of SNR values.

Figure 6:
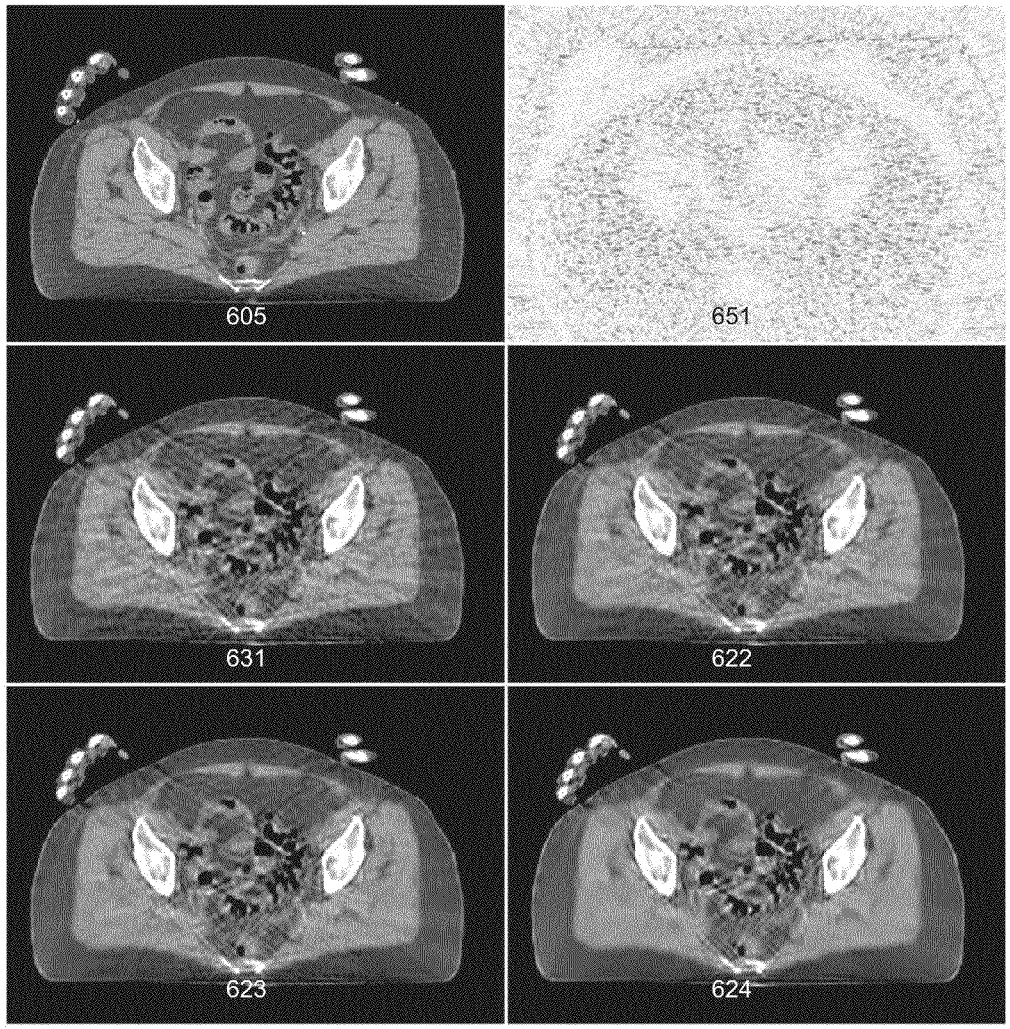
FIG. 6 depicts a reference image, four additional images reconstructed using stage-I processing and stage-II processing according to embodiments of the present invention, and a difference image showing a difference between stage-I processing and stage-II processing.

Regularization parameters were set to $\gamma_p = 10^{-4}$, $\gamma_r = 250$. The $\gamma_p$ parameter controls a shape of the pre-processing shrinkage functions, avoiding jumps resulting from outlier samples. The parameter $\gamma_r$ controls a tradeoff between a sharp and noisy image, obtained without the post-processing, and a smooth and clean image produced by the shrinkage operation. Its value is tuned manually for best visible impression. FIG. 6 displays the tradeoff, as further described below.

An FBP algorithm in the reconstruction chain of the above embodiment is implemented by a non-apodized Ram-Lak filter. It is noted that no low-pass filter is needed due to the de-noising action of the shrinkage tool.

Numerical experiments were also carried out with a non-decimated 3-level Haar Wavelet frame, and are not presented herein due to producing slightly inferior results, compared to a DCT. It seems that the particular choice of the transform does not significantly impact the quality of resultant images.

Figure 4:
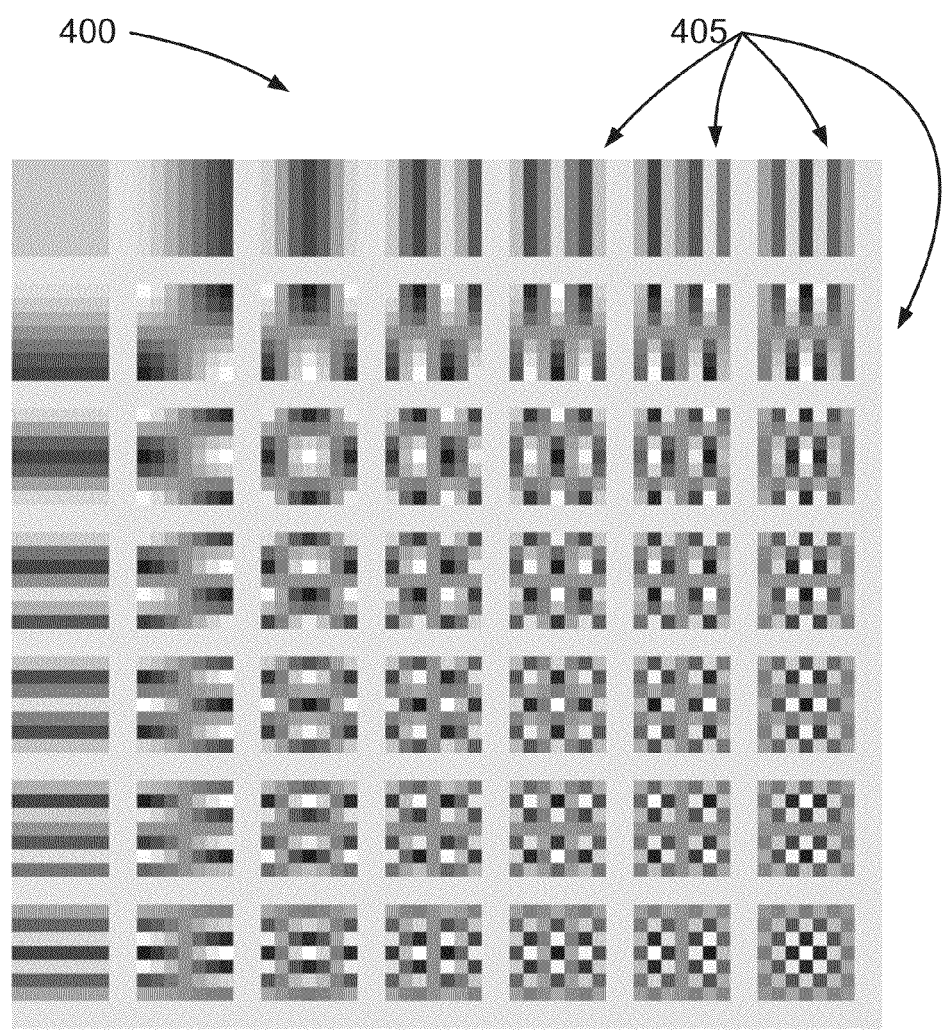
FIG. 4, which is a simplified illustration of a set of basis elements of a two-dimensional (2-D) Discrete Cosine Transform (DCT) as used in example embodiments of the invention.

Reference is now made to FIG. 4, which is a simplified illustration of a set of basis elements of a two-dimensional (2-D) Discrete Cosine Transform (DCT) as used in example embodiments of the invention.

FIG. 4 depicts an example 7×7 array 400 of 7×7 matrices 405.

Each matrix 405 represents a 7×7 convolution filter applied to an image (not shown), optionally simultaneously, for computation of a corresponding DCT coefficient from a 7×7 image patch.

The 7×7 matrices 405 represent 2-D functions comprising a basis of the DCT. Grey levels in the matrices 405 represent values of the DCT function.

It is noted that 7×7 is simply an example for an N×N array 400 of n×n matrices 405.

In some embodiments, a 2-D DCT transform is applied to an image X (not shown) having a dimension of n×n pixels. FIG. 4 illustrates an example where n=7. The 2-D DCT transform is optionally implemented as an n×n array of matrices (basis elements) 405 of size n×n each. Applying the DCT transform produces a transform of the image X, also having a dimension of n×n pixels. An (i,j)-th entry of the transform is produced by a basis element in row i and column j of the array 400 of matrices 405. Specifically, the (i,j)-th entry of the transform is computed as an inner product between a corresponding basis element and the image X. The (i,j)-th basis element is a Cronecker product of an i-th and a j-th 1-D DCT basis elements. Formulae for the 1-D DCT can be found in the above-mentioned reference "Discrete Cosine Transform" by Ahmed et al.

B. Visual Assessment of Algorithm Performance and Properties

A visual and quantitative comparison of images obtained using an embodiment of the present invention versus a standard FBP and versus an instance of iterative statistically-based algorithm, based on Penalized Weighted Least Squares (PWLS) optimization [6]. Standard FBP was implemented using a Ram-Lak filter [16] apodized with a low pass Butterworth window in the Fourier domain. The cut-off frequency and the degree of the window were tuned for best visual perception on the training set. The PWLS algorithm was implemented using the objective function from [6], which is optimized with the 1-BFGS method [25]:

$$\Lambda(f \mid y) = \frac{1}{2} \sum_l y_l ([Rf]_l - g_l)^2 + \gamma_H R(f), \quad \text{Equation 18}$$

$$g = -\log\left(\frac{y}{I_0}\right)$$

A penalty component R(f) is given by:

$$R(f) = \sum_p \sum_{k \in N(p)} \psi(f_p - f_k) \quad \text{Equation 19}$$

where $\psi(x)$ is the convex edge-preserving Huber penalty $$\psi(x, \delta) = \begin{cases} \dfrac{x^2}{2}, & x < \delta \\ \delta|x| - \dfrac{\delta^2}{2} & x \geq \delta \end{cases}$$

and N(p) are the four nearest neighbors of the pixel p.

Parameters $\gamma_H$, $\delta$ of the penalty component are optionally tuned manually for best visual impression on the restored images.

Subjective criteria for visual impression include one or more of the following: images should display sufficient sharpness to recover a maximal amount of original details; a noise level should not be so high as to obscure the original details. When there are several images, image quality is typically consistent among all or most images, and manual tuning is optionally performed for the several images to achieve a common impression of the reconstruction quality.

Two sets of parameters were learned by an example embodiment of the invention, using two training sets: male abdomen axial sections and male thighs sections (rows 1 and 3 in FIG. 1). In both cases, 9 images were used for the training. The noise level contaminating the training data corresponds to parameters $I_0=10^5$, $\sigma_n=10$. The choice of values for the above parameters was made by visual impression from FBP reconstruction at the above-mentioned noise level. A range of noise energy values was simulated, corresponding to exposure levels of $I_0=8\cdot10^4$, $10^5$, $2\cdot10^5$, and $4\cdot10^5$. The Gaussian noise level was fixed to $\sigma_n=10$.

The parameter $I_0$ depends on an empirical setup of, for example, a CT system, and is proportional to a number of photons per time unit. $\sigma_n$ is a standard deviation of the Gaussian noise, and has the same units as $I_0$.

Two images produced by the algorithm are now described: a stage-I output is a reconstructed image before post-processing with the learned shrinkage operator $S_r^I$, and a stage-II image is the result of post-processing.

1) Comparison of the Methods at Different Noise Levels:

First described is a sequence of reconstructed images of a female thigh axial slice, which was projected at different X-ray energy levels (listed above) and reconstructed with an example embodiment of the invention. One set of parameters was used, trained on male thighs images for level of noise corresponding to $I_0=10^5$.

Figure 5A:
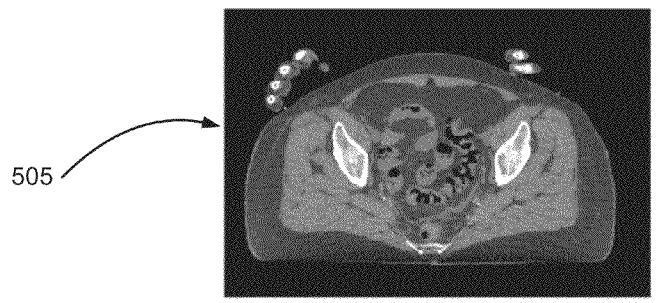
FIGS. 5A-5B.
Figure 5B:
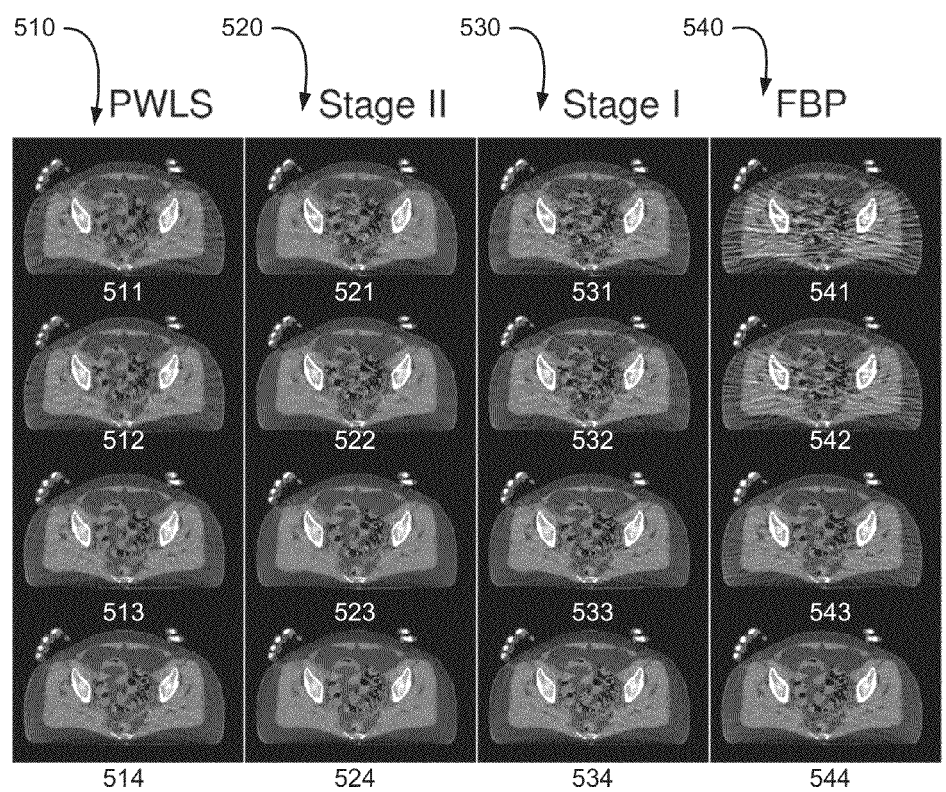

Reference is now made to FIG. 5A, which depicts an image of a first reference image, and to FIG. 5B, which depicts sixteen additional images, reconstructed using four methods at four levels of noise.

FIG. 5A depicts a reference image 505, which is image 242 of FIG. 2 and FIG. 5B depicts four columns 510 520 530 540 of images.

The four columns 510 520 530 540 display, from left to right: a column 510 of images resulting from applying PWLS according to an embodiment of the invention to a sinogram of the reference image 505, a column 520 of images resulting from applying stage-II processing according to an embodiment of the invention to a sinogram of the reference image 505, a column 530 of images resulting from applying stage-I processing according to an embodiment of the invention to a sinogram of the reference image 505, and a column 540 of images resulting from applying standard FBP processing to a sinogram of the reference image 505.

The four columns 510 520 530 540 display, from top to bottom: X-ray doses corresponding to $I_0=7\cdot10^4$; $10^5$; $2\cdot10^5$; $4\cdot10^5$.

It is noted that the FPB reconstruction was tuned separately for each noise level.

The images display the following properties:

Image reconstruction according to an embodiment of the invention is robust with respect to different patients, since the training set is taken from one patient and images of FIG. 4 are taken from another patient, scanned with the same protocol on same scanner.

Image reconstruction according to an embodiment of the invention performs well on a wide range of exposure levels, both above and below levels used during a training session.

Image reconstruction according to an embodiment of the invention successfully reduces streak artifacts, typically caused by low photon counts, while FBP images are substantially corrupted with streak artifacts.

2) The Impact of Post-Processing:

The effect of post-processing by learned shrinkage is demonstrated, comparing stage-I and stage-II applications of an example embodiment of the invention.

Reference is now made to FIG. 6, which depicts a reference image 605, four additional images 631 622 623 624 reconstructed using stage-I processing and stage-II processing according to embodiments of the present invention, and a difference image 651 showing a difference between stage-I processing and stage-II processing.

FIG. 6 depicts:

the reference image 605;

a stage-I reconstruction image $f_0$ 631 showing what the reference image 605 looks like when reconstructed by stage-I processing;

a stage-II reconstruction image $f_1$ 622 showing what the reference image 605 looks like when reconstructed by stage-II processing at $\gamma_r=1000$;

a stage-II reconstruction image $f_2$ 623 showing what the reference image 605 looks like when reconstructed by stage-II processing at $\gamma_r=250$;

a stage-II reconstruction image $f_3$ 624 showing what the reference image 605 looks like when reconstructed by stage-II processing at $\gamma_r=1$; and a difference image $f_0$-$f_2$ 651 showing the difference between stage-I processing and one of the examples of stage-II processing.

FIG. 6 depicts a dynamic range restricted to from −100 to +300 Hounsfield Units.

FIG. 6 depicts a reconstruction of the image used in FIG. 5A, scanned at an X-ray dose corresponding to $I_0=10^5$. Three images 622 623 624 of stage-II post-processing shrinkage, trained with different values of the parameter $\gamma_r$ are displayed. In the images 622 623 624, a reduction of noise which was present in the reconstructed image $f_0$ before the post-processing (middle left), is seen, along with an increased blur. The SNR value of the reconstructed images increased: from 25.21 dB for stage-I reconstruction before any stage-II shrinkage action, to 25.56 dB for $\gamma_r=1000$, to 25.72 dB for $\gamma_r=250$, to 25.90 dB for $\gamma_r=1$. It is noted that further reduction in $\gamma_r$ did not increase the SNR in the test image.

The image $f_2$ 623 corresponding to $\gamma_r=250$ appears to provide a most visually appealing balance between noise variance and image resolution. An absolute-valued difference between the image $f_2$ 623 and $f_0$ is displayed as the upper right image $f_0$-$f_2$ 651 of FIG. 6. Observation of the image $f_0$-$f_2$ 651 finds no structural details present in the image $f_0$-$f_2$ 651, which is a difference map, which shows that the post-processing with learned shrinkage successfully separated the noise from the data.

3) Lesion Detectability:

An experiment at detecting a lesion was designed as follows: a small ellipse-shaped blob was added in a homogeneous region of an image of a female thigh.

Figure 7:
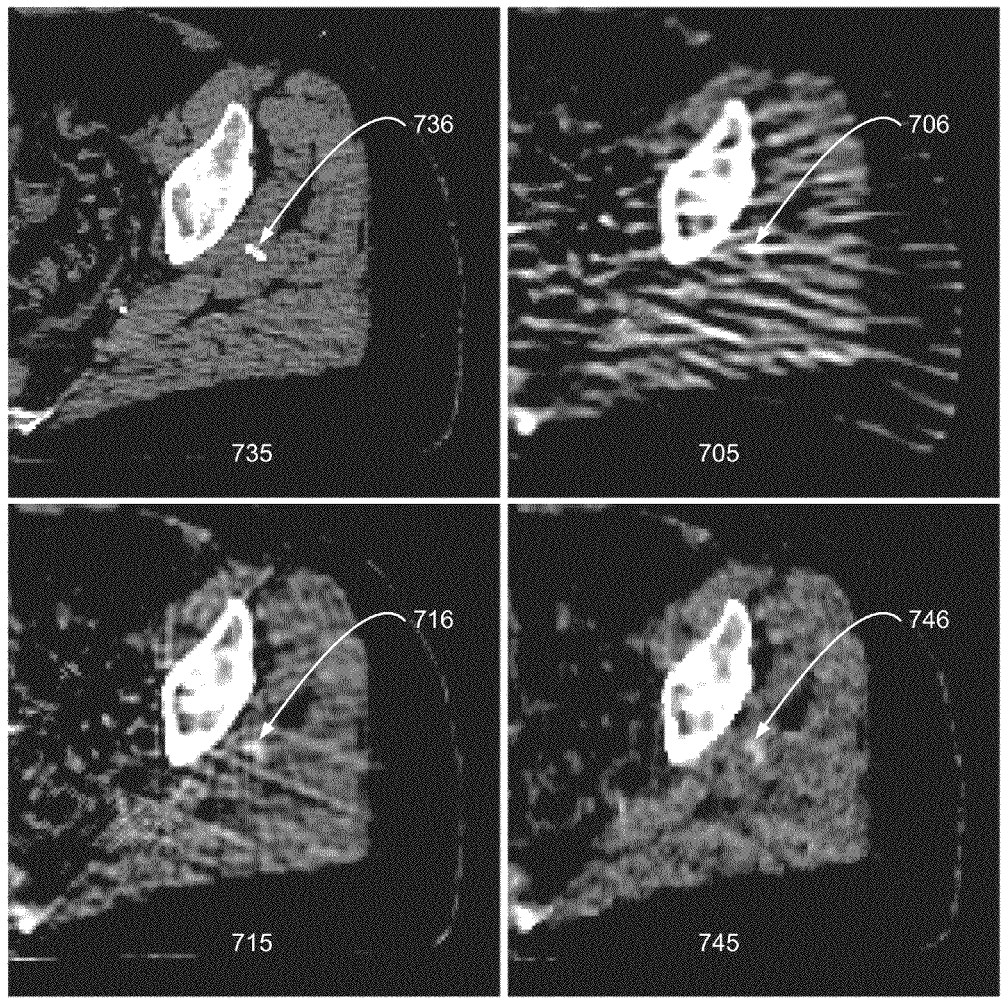
FIG. 7 depicts a set of four images demonstrating a lesion detectability test, comparing three methods of image reconstruction.

Reference is now made to FIG. 7, which depicts a set of four images demonstrating a lesion detectability test, comparing three methods of image reconstruction.

FIG. 7 depicts a reference image 705, an FBP reconstruction image 745, a stage-I reconstruction image 735, and a PWLS reconstruction image 715. The images are depicted in a range of 40 to 300 Hounsfield Units for better visibility.

FIG. 7 depicts the same region in the various images.

The reference image 705 has an ellipse-shaped blob 706 added to the reference image 705. The ellipse-shaped blob 706 represents a lesion. Average intensity of the ellipse-shaped blob 706 is 159 HU, on a background having an average intensity of 108 HU. The experiment was conducted under conditions of $I_0=7\cdot 10^4$ photons, which is considered a condition of relatively strong noise, almost concealing an outstanding spot 746 in the FBP reconstruction image 745.

The FBP reconstruction image 745 barely shows the lesion, as the outstanding spot 746.

The stage-I reconstruction image 735 most clearly shows the lesion, as the outstanding spot 736.

The PWLS reconstruction image 715 also barely shows the lesion, as the outstanding spot 716.

It is evident that the synthetic lesion (no such structure was present in the training data) is recovered, and, in contrast with the FBP image, can be observed. PWLS produces an image of slightly higher quality, but the stage-I image produces best quality.

4) Robustness with Respect to Training Set:

Dependence of applications of an example embodiment of the invention on the anatomical region from which the restored images are chosen is investigated by cross-validation.

Figure 8:
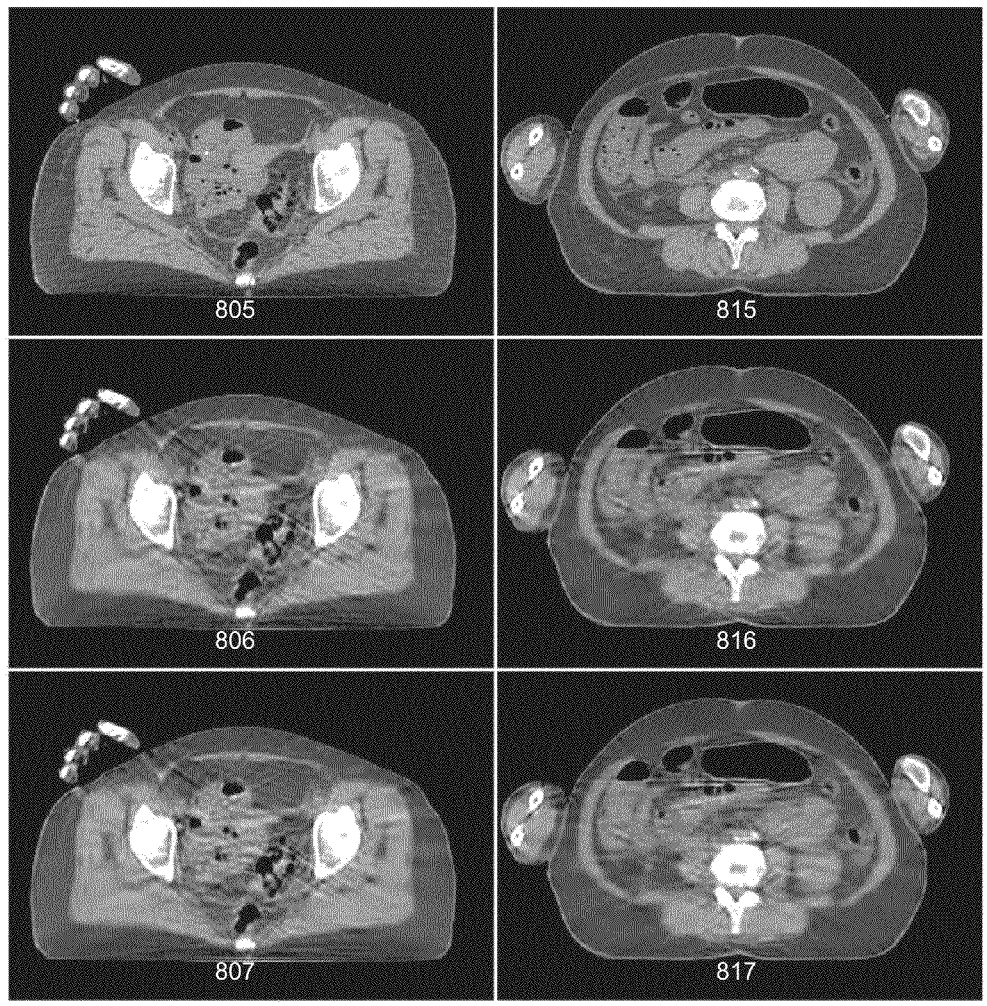
FIG. 8 depicts images reconstructed by two instances of example embodiments of the invention: a first instance learned on a training set composed of male thigh images, and a second instance learned on a training set of male abdomen images.

Reference is now made to FIG. 8, which depicts images reconstructed by two instances of example embodiments of the invention: a first instance learned on a training set composed of male thigh images, and a second instance learned on a training set of male abdomen images.

FIG. 8 depicts, at the top row of images, a reference male thigh image 805 and a reference male abdomen image 815.

FIG. 8 depicts, at the middle row of images, a reconstruction of a female thigh image 806 and a reconstruction of a female abdomen image 816, both using methods trained by the using the male thigh image 805.

FIG. 8 depicts, at the bottom row of images, a reconstruction of a female thigh image 807 and a reconstruction of a female abdomen image 817, both using methods trained by the using the male abdomen image 815.

The embodiment trained on a training set of male thigh images was used to reconstruct both an image of female thighs and an image of a female abdomen.

The embodiment trained on a training set of male abdomen images was used to reconstruct the same images: an image of female thighs and an image of a female abdomen.

FIG. 8 depicts images reconstructed by two instances of example embodiments of the invention: a first instance learned on a training set composed of male thigh images, and a second instance learned on a training set of male abdomen images. Each instance was used to process two test images: one of female thighs, and one of a female abdomen. The two versions of each test image appear similar, which implies robustness of the training procedure with respect to the anatomical region in the body from which a training set was selected.

5) Training Objective in Projection Domain:

The training objective stated in Equation 13 penalizes MSE in the projection domain.

Figure 9:
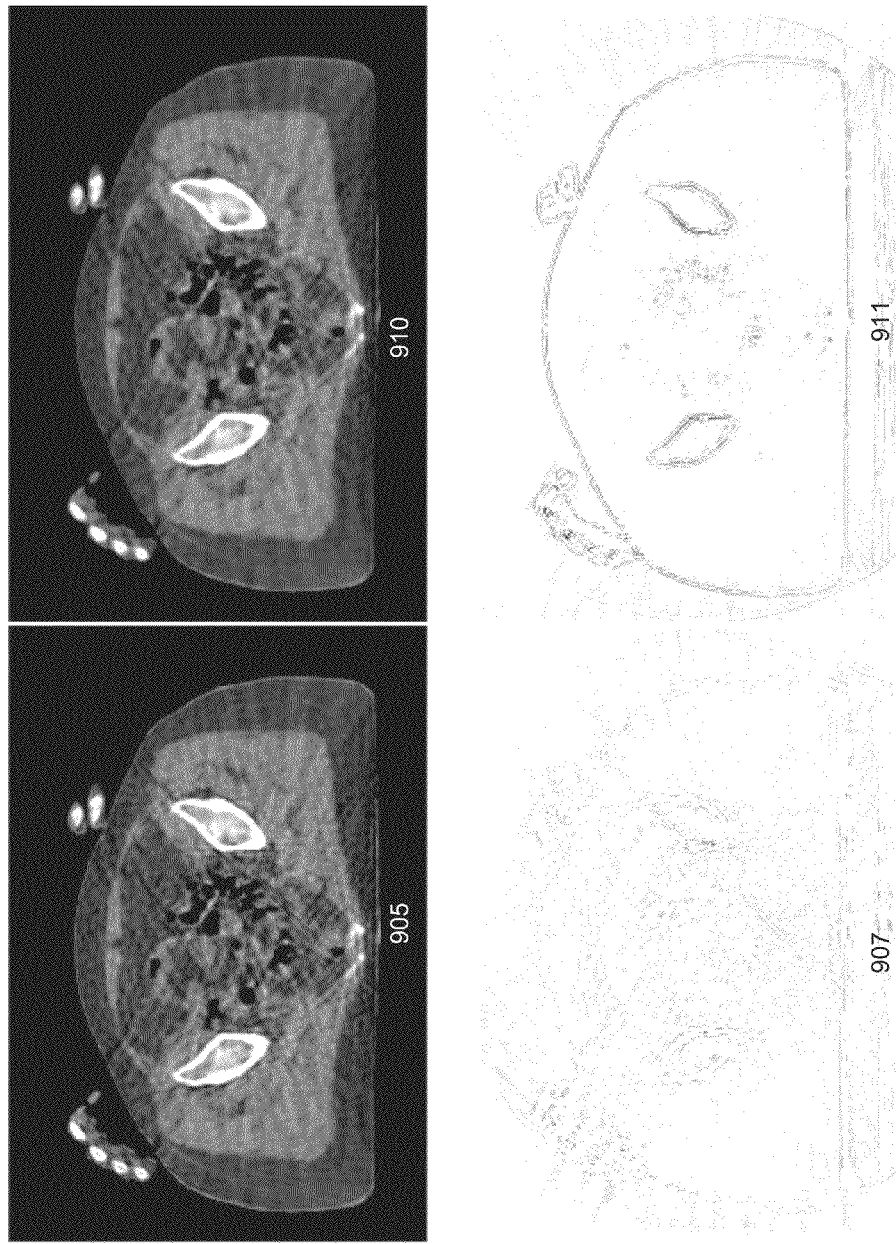
FIG. 9 depicts results of two example embodiments of the invention reconstructing a reference image: a first embodiment trained in the projection domain, and a second embodiment trained in the image domain.

Reference is now made to FIG. 9, which depicts results of two example embodiments of the invention reconstructing a reference image: a first embodiment trained in the projection domain, and a second embodiment trained in the image domain.

FIG. 9 depicts a first image 910 reconstructed using a first embodiment of the invention, trained in the projection domain; and a second image 905 reconstructed using a second embodiment of the invention, trained in the image domain.

FIG. 9 also depicts relative two difference images 907 911, as explained below.

Objective functions, used for the training, were Equation (14) and Equation (13). To visualize the difference between the reconstructed images and the reference image, the following imaging technique is used:

Two difference images $d_1=|f_1-f_{ref}|$ and $d_2=|f_2-f_{ref}|$ are computed for the two reconstructed images 905 910 $f_1$, $f_2$ respectively, and a reference image $f_{ref}$.

Two relative difference images 907 911 are computed to have only non-negative values as follows: $rd_1=\max(0, d_1-d_2)$ and $rd_2=\max(0, d_2-d_1)$. $rd_1$ has only non-negative values, which are non-zero only at locations where $f_1$ has a larger error than $f_2$. Intensity values in the difference images correspond to differences in errors in these locations. The same holds for the $rd_2$ image. The relative difference images $rd_1$ 907 and $rd_2$ 911 are presented in the lower row of FIG. 9. The $rd_1$ 907 and the $rd_2$ 911 images show that image-domain training (left, rd1 907) leads to an image where strong edges are preserved better than in the outcome of the sinogram-based training (right, rd2 911). The better edge preservation is due to slightly stronger background noise. SNR values are 25.21 dB and 24.47 dB for the left image 905 and the right image 910 correspondingly. The improvement in edge preservation is expected, because image-domain-oriented training aims directly to increase the SNR.

C. Quantitative Measures of Performance

For a quantitative estimation of the algorithm performance, a number of standard quality measures are computed. A Mean Square Error, scaled by the signal's energy and log-transformed, defines the Signal-to-Noise Ratio (SNR): for an ideal signal x and a deteriorated version $\hat{x}$, $$SNR(x, \hat{x}) = -10 \cdot \log_{10} \frac{\|x-\hat{x}\|_2^2}{\|x\|_2^2} \quad \text{Equation 20}$$

Corruption introduced into an image by measurement noise can be measured directly by comparison to the reference image.

The standard estimation of image corruption via image variance in presumably smooth locations is replaced with the $L_2$ norm of a difference between a reconstructed image and a reference image.

Spatial resolution properties of a non-shift-invariant reconstruction method is optionally characterized using a Local Impulse Response function (LIR) instead of a standard point-spread function [26]. The LIR functions are computed by placing sharp impulses (single pixels) in random locations in a reference image and taking the difference of reconstructed images, scanned with and without the impulses. For each LIR, a Full-Width Half-Maximum (FWHM) value is computed.

Figure 10:
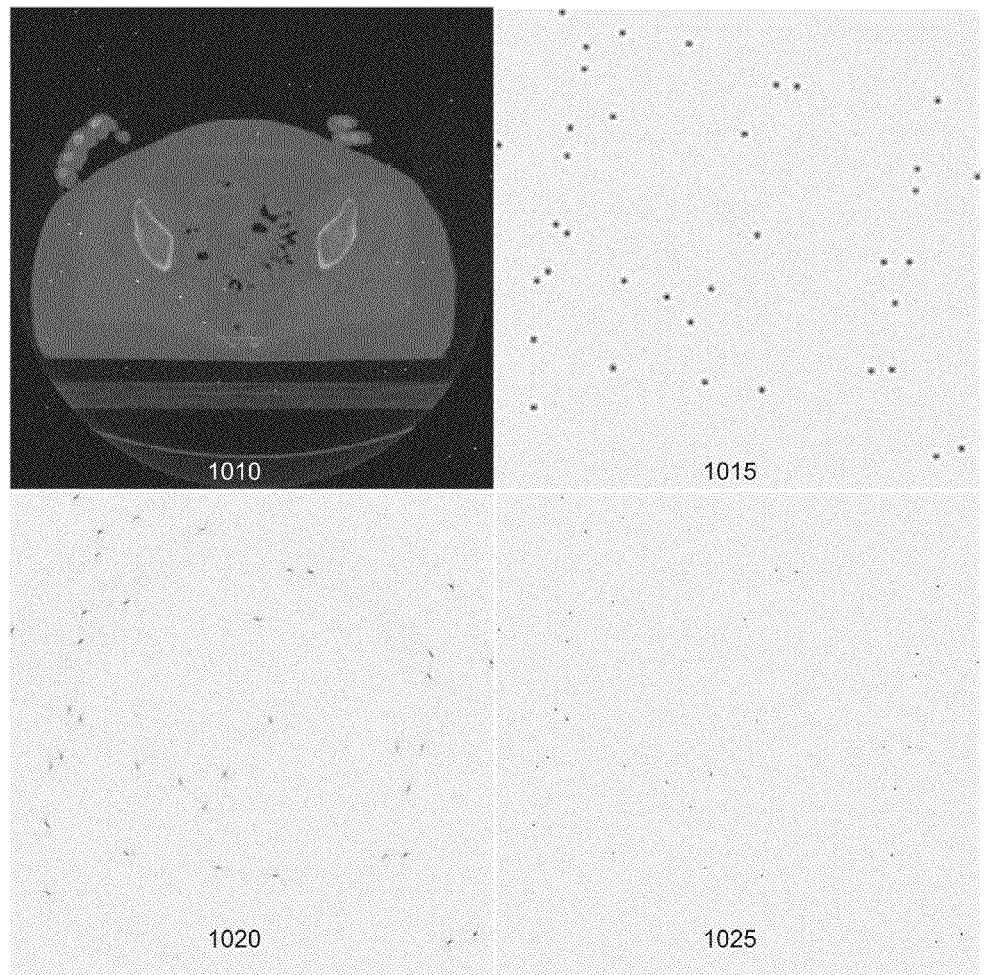
FIG. 10 depicts a reference image including Local Impulse Responses (LIRs), and three images demonstrating how three methods of image reconstruction handle the single-pixel impulses.

Reference is now made to FIG. 10, which depicts a reference image 1010 including Local Impulse Responses (LIRs), and three images demonstrating how three methods of image reconstruction handle the single-pixel impulses.

FIG. 10 depicts a first image 1015 which is a map of LIRs obtained in an image reconstructed by the FBP method; a second image 1020 which is a map of LIRs obtained in an image reconstructed by an embodiment of the present invention; and a third image 1025 which is a map of LIRs obtained in an image reconstructed by the PWLS method.

The LIR maps are presented as negative maps for better visualization, that is, the impulses are presented as dark areas on a light background, rather than as light areas on a dark background, as is represented in the reference image 1010.

FIG. 10 depicts the first image 1015, which is a map of LIRs obtained in an image reconstructed by the FBP method, having uniform blurred spots.

FIG. 10 depicts the third image 1025, which is a map of LIRs obtained in an image reconstructed by the PWLS method, exhibiting a superior spatial resolution—its LIRs are only slightly blurred in the middle of the image.

FIG. 10 depicts the second image 1020, which is a map of LIRs obtained in an image reconstructed by an embodiment of the present invention, exhibiting anisotropic impulse responses which appear stretched along concentric circles in the image.

Conceptually, the anisotropic impulse responses may be seen as a drawback of embodiments of an embodiment of the invention. However, the phenomenon does not seem to have negative implications for the visual perception of reconstructed clinical images.

FWHM values for the LIRs (except those in the background) are shown below in FIG. 11.

Figure 11:
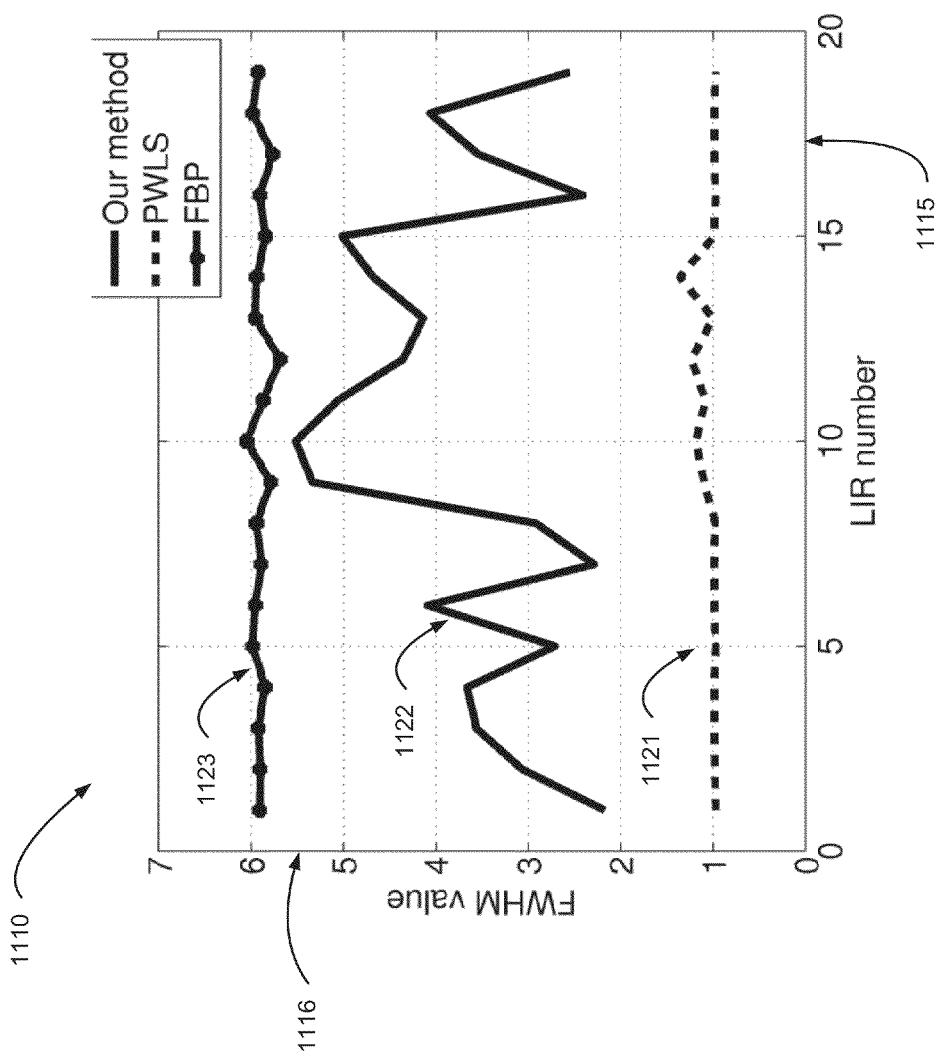
FIG. 11 is a graph 1110 comparing FWHM values for LIRs at locations in the images of FIG. 10.

Reference is now made to FIG. 11, which is a graph 1110 comparing FWHM values for LIRs at locations in the images of FIG. 10.

FIG. 11 depicts a graph having an x-axis 1115 which lists an enumeration of LIR locations; and a y-axis 1116 which depicts FWHM values of the LIR locations.

FIG. 11 depicts a first line 1121 connecting FWHM values of the reconstructed image produced by the PWLS method; a second line 1122 connecting FWHM values of the reconstructed image produced by an embodiment of the present invention; and a third line 1123 connecting FWHM values of the reconstructed image produced by the FBP method.

The graphs for FBP and PWLS display relatively constant values, while an example embodiment of the invention produces LIRs with varying size, which fall in the middle range comparing to those two standard methods. The average FWHM value for FBP, which is 5.9, is reduced to 3.74 when the example embodiment of the invention is applied; the PWLS is still better, producing almost perfect reconstruction, having an average FWHM value of 1.03 of the initial spikes, which have a FWHM value of 0.98.

The set of quality measures defined above were computed over a test set of 15 images, of sections of female thighs. For a resolution measure 4 points are chosen at random in each image, excluding the background and the FWHM values computed at those points are averaged.

The measures are presented in Table 1 below. A standard FBP performs poorly, exhibiting both large noise energy and a low resolution. Two stages of example embodiments of the invention display improved noise-resolution values. Post-processing is observed to reduce the noise level by a factor of 2 for a cost of a slightly lower resolution—this is also observed in the images. PWLS images have a lower noise level than stage-I images, but higher than stage-II images, and PWLS images have a superior resolution. The last column of Table 1 shows that example embodiments of the invention succeeds in raising FBP SNR values by 4.2 dB, while still falling 0.7 dB below the PWLS method.

| SNR (dB) | Resolution (FWHM) | std. dev. of noise × $10^3$ | Method thigh images |
|---|---|---|---|
| 21.53 | 5.90 | 1.40 | FBP |
| 25.26 | 3.81 | 0.33 | Stage-I |
| 25.77 | 4.11 | 0.15 | Stage-II |
| 26.53 | 1.03 | 0.25 | PWLS |

Discussion:

The above description introduced, via some example embodiments of the invention, a practical CT reconstruction method which performs non-linear processing of measurement data and reconstructed images. Both actions are aimed at high-quality reconstruction from data corrupted with photon count noise and electronic noise. Defining parameters of the above-described processing tools are optionally trained in an off-line session on a set of available reference images. When applied to deteriorated measurements of similar images, the example embodiments produce image reconstructions which improve upon standard FBP image reconstructions, and are comparable to the much-more-computationally-intensive iterative PWLS reconstruction.

Learned shrinkage applies, in some example embodiments, a non-linear two-dimensional filter in the domain of the noisy measurement data, which was shown to be capable of substantially reducing the streak artifacts caused by the measurement noise. Further post-processing action, an image de-noising task, is optionally carried out, in some embodiments of the invention, by an adaptive algorithm in the CT image domain.

Visual observations, supported by quantitative measures, point to the quality improvement which embodiments of the invention bring to reconstructed images.

As with any algorithm, based on supervised learning, there is a concern of whether medical anomalies and special objects are faithfully recovered. In the simulations described above, visual comparison of images reconstructed by embodiments of the invention to the reference images confirm that the content is faithfully recovered.

Also, we point to the fact the processing is performed locally (for example in 7×7 squares) and in a transform domain; the action of the shrinkage operation is of statistical rather than geometric nature, thus it is improbable it will be biased by specific anatomical structures.

Some example embodiments of the invention require no hardware changes in existing CT scanners and can be easily incorporated into the reconstruction software of the existing CT scanners; thus in practice embodiments of the invention can be implemented in existing clinical machinery with small effort.

Reference is made to simplified illustrations of some example embodiments of the invention.

Figure 12A:
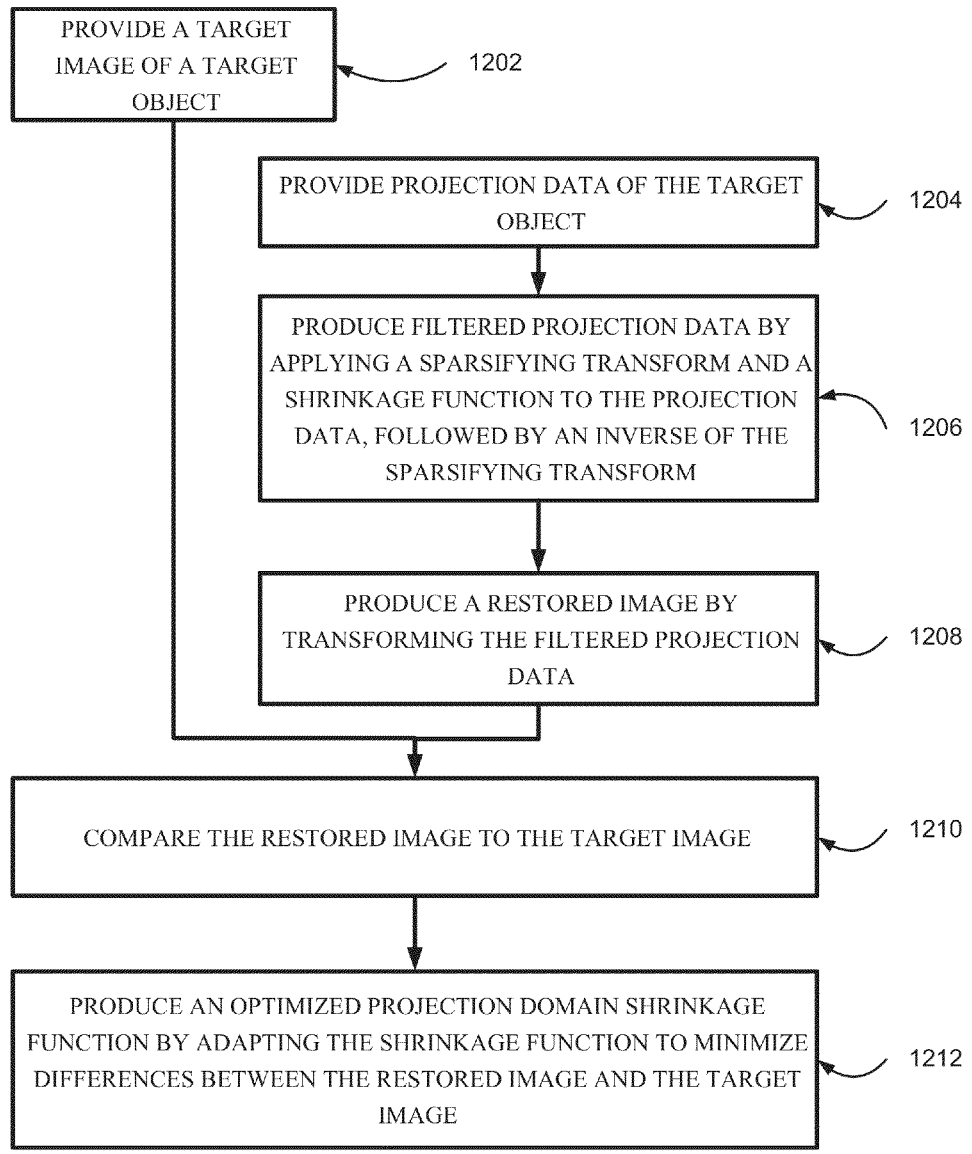
FIG. 12A is a simplified flow chart illustration of an example embodiment of the invention.

Reference is now made to FIG. 12A, which is a simplified flow chart illustration of an example embodiment of the invention.

FIG. 12A depicts a method of producing projection domain shrinkage functions for use in reconstructing projection-reconstruction images, the method comprising:

providing a target image of a target object (1202);

providing projection data of the target object (1204);

producing filtered projection data by applying a sparsifying transform and a shrinkage function to the projection data, followed by an inverse of the sparsifying transform (1206);

producing a restored image by transforming the filtered projection data (1208);

comparing the restored image to the target image (1210); and producing an optimized projection domain shrinkage function by adapting the shrinkage function to minimize differences between the restored image and the target image (1212).

The term "optimized projection domain shrinkage function" in all its grammatical forms is used throughout the present specification and claims to mean a projection domain shrinkage function produced as described herein.

It is noted that producing the target image of the target object (1202) does not have to occur before some of the rest of the method, just that the target image needs to be produced before it is compared with the restored image.

In some embodiments the projection data is adjusted by applying a regularization operation to the projection data (following 1204), producing regularized projection data, and the shrinkage function is applied to the regularized projection data (in 1206).

In some embodiments of the invention, the differences between the restored image and the target image are measured by calculating a Mean Square Error between pixels of the restored image and the target image.

In some embodiments of the invention, the differences between the restored image and the target image are indicated by a person providing a subjective visual quality measure.

In some embodiments of the invention, the person indicates, by way of a non-limiting example using a scale of 1-4, how close the restored image is to the target image. For example: 1 is "very far", 2 is "far", 3 is "close" 4 is "perfect— as far as I can see". The above example is not meant to be non-limiting. The example is an example of using a fuzzy logic value to indicate how close the restored image is to the target image, yet a person skilled in the art can propose other qualitative and/or quantitative ways to indicate how close the restored image is to the target image.

In some embodiments of the invention, the shrinkage function comprises a smaller array than the projection data. As described above, the shrinkage function may include a matrix as small as 3×3, 5×5, 7×7, or 9×9 elements.

In some embodiments of the invention, the target image is produced using a high dose projection, and the projection data is produced using a lower dose projection.

In some embodiments of the invention, the target object is a cadaver.

Figure 12B:
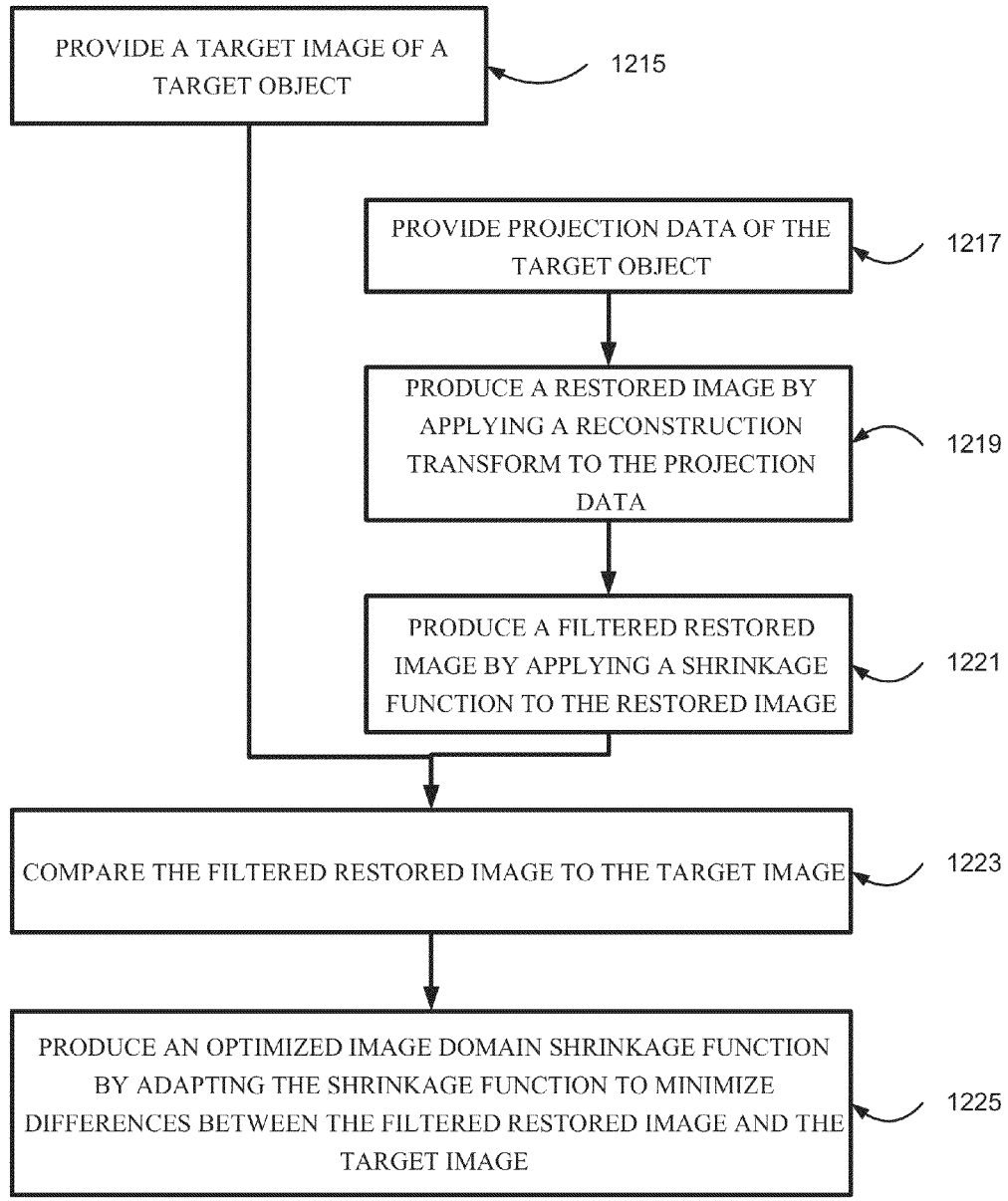
FIG. 12B is a simplified flow chart illustration of another example embodiment of the invention.

Reference is now made to FIG. 12B, which is a simplified flow chart illustration of another example embodiment of the invention.

FIG. 12B depicts a method of producing image domain shrinkage functions for use in reconstructing projection-reconstruction images, the method comprising:

providing a target image of a target object (1215);

providing projection data of the target object (1217);

producing a restored image by applying a reconstruction transform to the projection data (1219);

producing a filtered restored image by applying a shrinkage function to the restored image (1221);

comparing the filtered restored image to the target image (1223); and producing an optimized image domain shrinkage function by adapting the shrinkage function to minimize differences between the filtered restored image and the target image (1225).

The terms "optimized image domain shrinkage function" and "optimized projection domain shrinkage function" in all their grammatical forms are used throughout the present specification and claims to mean an image domain shrinkage function and a projection domain shrinkage function respectively, which are produced as described herein.

It is noted that producing the target image of the target object (1215) does not have to occur before some of the rest of the method, just that the target image needs to be produced before it is compared with the filtered restored image.

In some embodiments optimized projection data is optionally produced by applying a shrinkage function to the projection data, and the restored image is produced by transforming the optimized projection data.

In some embodiments of the invention, the differences between the restored image and the target image are measured by calculating a Mean Square Error between pixels of the restored image and the target image.

In some embodiments of the invention, the differences between the restored image and the target image are indicated, qualitatively and/or quantitatively, by a person providing a subjective visual quality measure.

In some embodiments of the invention the shrinkage function comprises a smaller array than the restored image. As described above, the shrinkage function may include a matrix as small as 3×3, 5×5, 7×7, or 9×9 elements.

In some embodiments of the invention the target image is produced using a high dose projection, and the projection data is produced using a lower dose projection.

In some embodiments of the invention the target object is a cadaver.

Figure 12C:
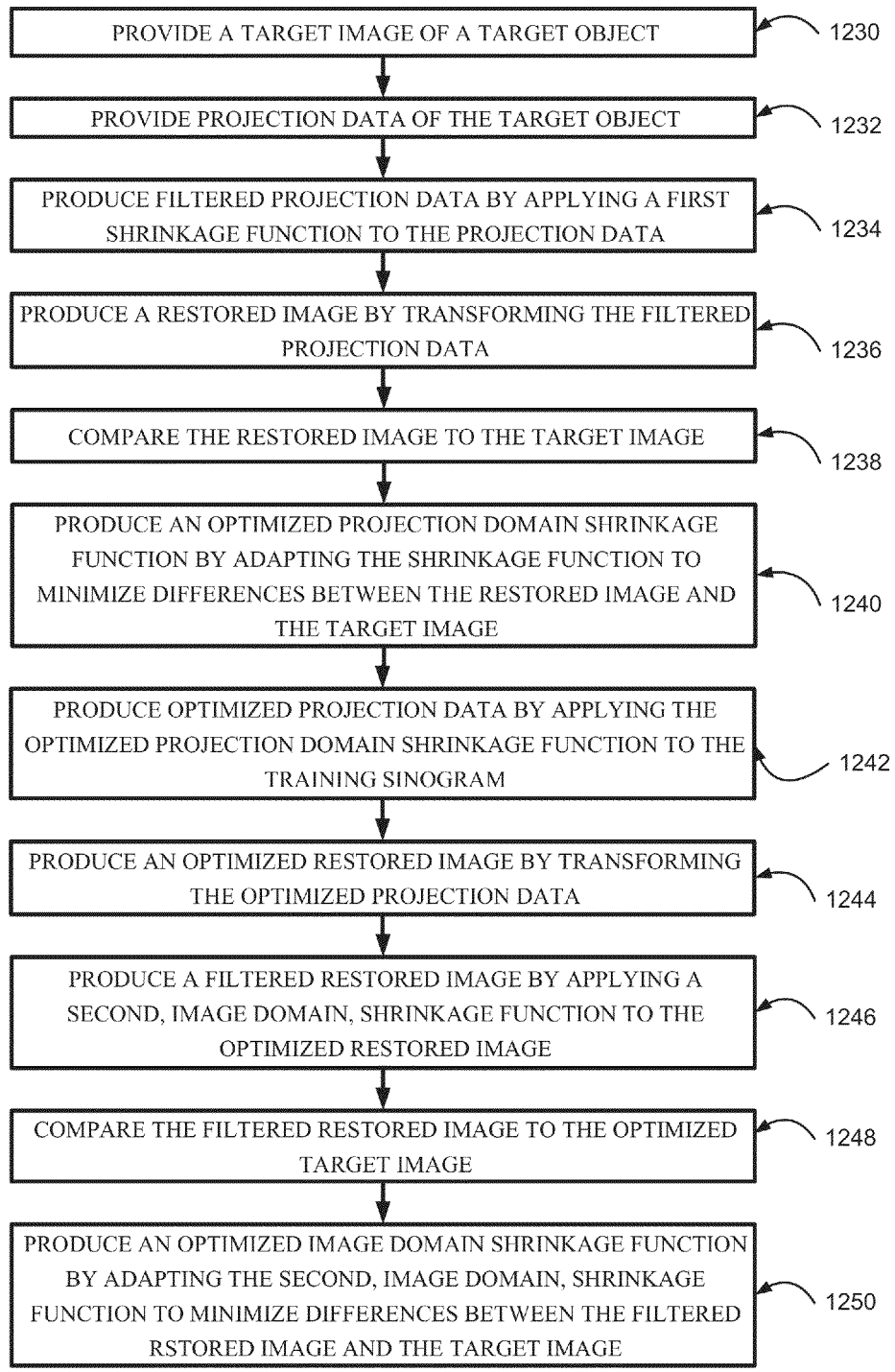
FIG. 12C is a simplified flow chart illustration of yet another example embodiment of the invention.

Reference is now made to FIG. 12C, which is a simplified flow chart illustration of yet another example embodiment of the invention.

FIG. 12C depicts a method of producing a pair of projection domain and image domain shrinkage functions for use in reconstructing projection-reconstruction images, the method comprising:

providing a target image of a target object (1230);

providing projection data of the target object (1232);

producing filtered projection data by applying a shrinkage function to the projection data (1234);

producing a restored image by transforming the filtered projection data (1236);

comparing the restored image to the target image (1238);

producing an optimized projection domain shrinkage function by adapting the shrinkage function to minimize differences between the restored image and the target image (1240);

producing an optimized training sinogram by applying the optimized projection domain shrinkage function to the training sinogram (1242);

producing an optimized restored image by transforming the optimized projection data (1244);

producing a filtered restored image by applying a second, image domain shrinkage function to the optimized restored image (1246);

comparing the filtered restored image to the optimized target image (1248); and producing an optimized image domain shrinkage function by adapting the second, image domain, shrinkage function to minimize differences between the filtered restored image and the target image (1250).

In some embodiments of the invention, the differences between the filtered restored image and the target image are measured by calculating a Mean Square Error between pixels of the restored image and the target image.

In some embodiments of the invention, the differences between the restored image and the target image are indicated by a person providing a subjective visual quality measure.

In some embodiments of the invention the first shrinkage function comprises a smaller array than the projection data.

In some embodiments of the invention the second shrinkage function comprises a smaller array than the restored image.

In some embodiments of the invention the target image is produced using a high dose projection, and the projection data is produced using a lower dose projection.

In some embodiments of the invention the target object is a cadaver.

Figure 13A:
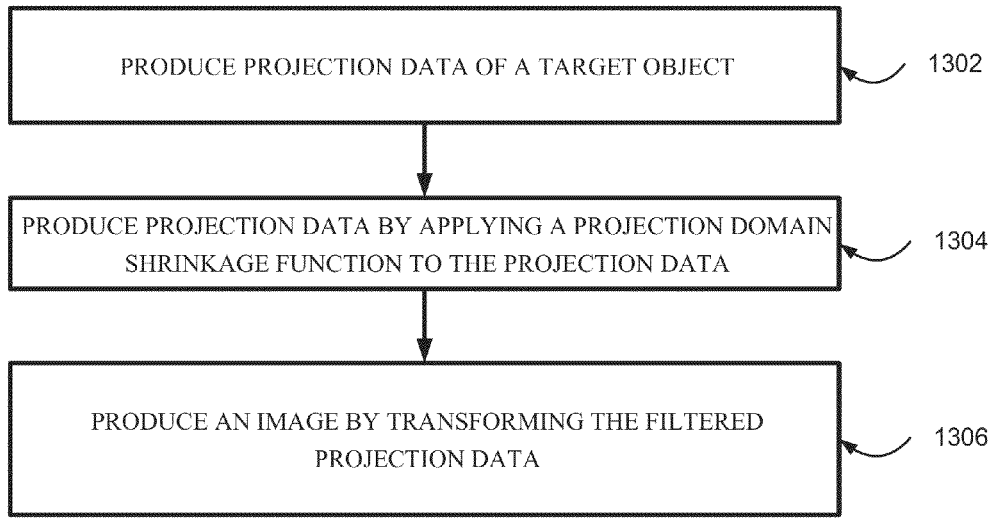
FIG. 13A is a simplified flow chart illustration of still another example embodiment of the invention.

Reference is now made to FIG. 13A, which is a simplified flow chart illustration of still another example embodiment of the invention.

FIG. 13A depicts a method of reconstructing projection-reconstruction images using projection domain shrinkage functions comprising:
  producing projection data of a target object (1302);
  producing filtered projection data by applying a projection domain shrinkage function to the projection data (1304); and
  producing an image by transforming the filtered projection data (1306).

In some embodiments of the invention the projection domain shrinkage function comprises a smaller array than the projection data.

Figure 13B:
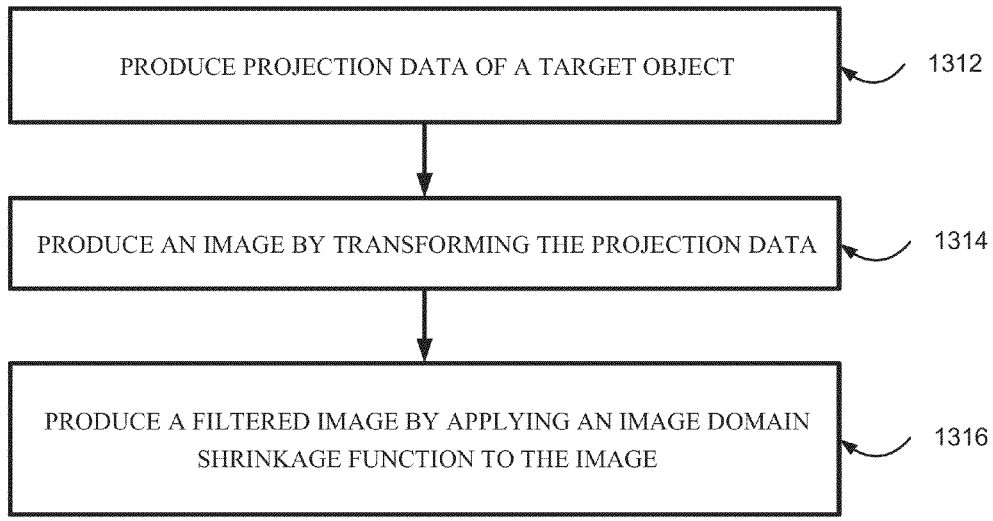
FIG. 13B is a simplified flow chart illustration of yet another example embodiment of the invention.

Reference is now made to FIG. 13B, which is a simplified flow chart illustration of yet another example embodiment of the invention.

FIG. 13B depicts a method of reconstructing projection-reconstruction images using image domain shrinkage functions comprising:
  producing projection data of a target object (1312);
  producing an image by transforming the projection data (1314);
  producing a filtered image by applying an image domain shrinkage function to the image (1316).

In some embodiments of the invention the image domain shrinkage function comprises a smaller array than the image.

Figure 13C:
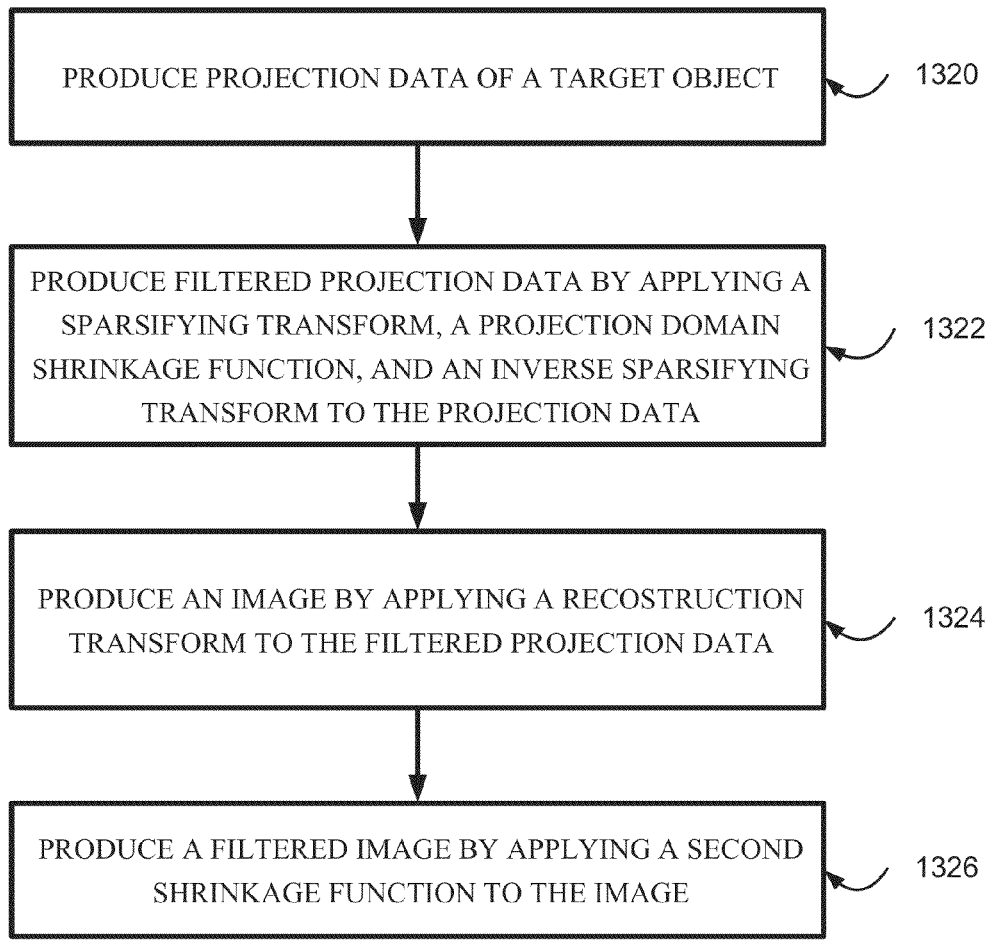
FIG. 13C is a simplified flow chart illustration of still another example embodiment of the invention.

Reference is now made to FIG. 13C, which is a simplified flow chart illustration of still another example embodiment of the invention.

FIG. 13C depicts a method of reconstructing projection-reconstruction images using projection domain shrinkage functions and image domain shrinkage functions, comprising:
  producing projection data of a target object (1320);
  producing filtered projection data by applying a sparsifying transform, a projection domain shrinkage function, and an inverse sparsifying transform to the projection data (1322);
  producing an image by transforming the filtered projection data (1324); and
  producing a filtered image by applying a second shrinkage function to the image (1326).

In some embodiments of the invention the first shrinkage function comprises a smaller array than the projection data.

In some embodiments of the invention the second shrinkage function comprises a smaller array than the image.

Reference is now made to FIG. 14A, which is a simplified block diagram illustration of yet another example embodiment of the invention.

FIG. 14A depicts a projection reconstruction system 1400 which produces reconstructed images, including:
  a projection data production module 1402 producing output of projection data 1404;
  a filtering module 1406 which accepts as input the projection data 1404, producing output of filtered projection data 1408 by applying a projection domain shrinkage function to the projection data 1404; and
  an image reconstruction module 1410 which accepts as input the filtered projection data 1408, for producing an image by transforming the filtered projection data 1408.

Reference is now made to FIG. 14B, which is a simplified block diagram illustration of still another example embodiment of the invention.

FIG. 14B depicts a projection reconstruction system 1440 which produces reconstructed images, including:
  a projection data production module 1442 producing output of projection data 1444;
  a filtering module 1446 which accepts as input the projection data 1444, producing output of filtered projection data 1448 by applying a projection domain shrinkage function to the projection data 1444; and
  an image reconstruction module 1450 which accepts as input the filtered projection data 1448, for producing an image 1452 by transforming the filtered projection data 1448;
  a filtering module 1454 which accepts as input the image 1452, producing output of a filtered image by applying an image domain shrinkage function to the image 1454.

Figure 14C:
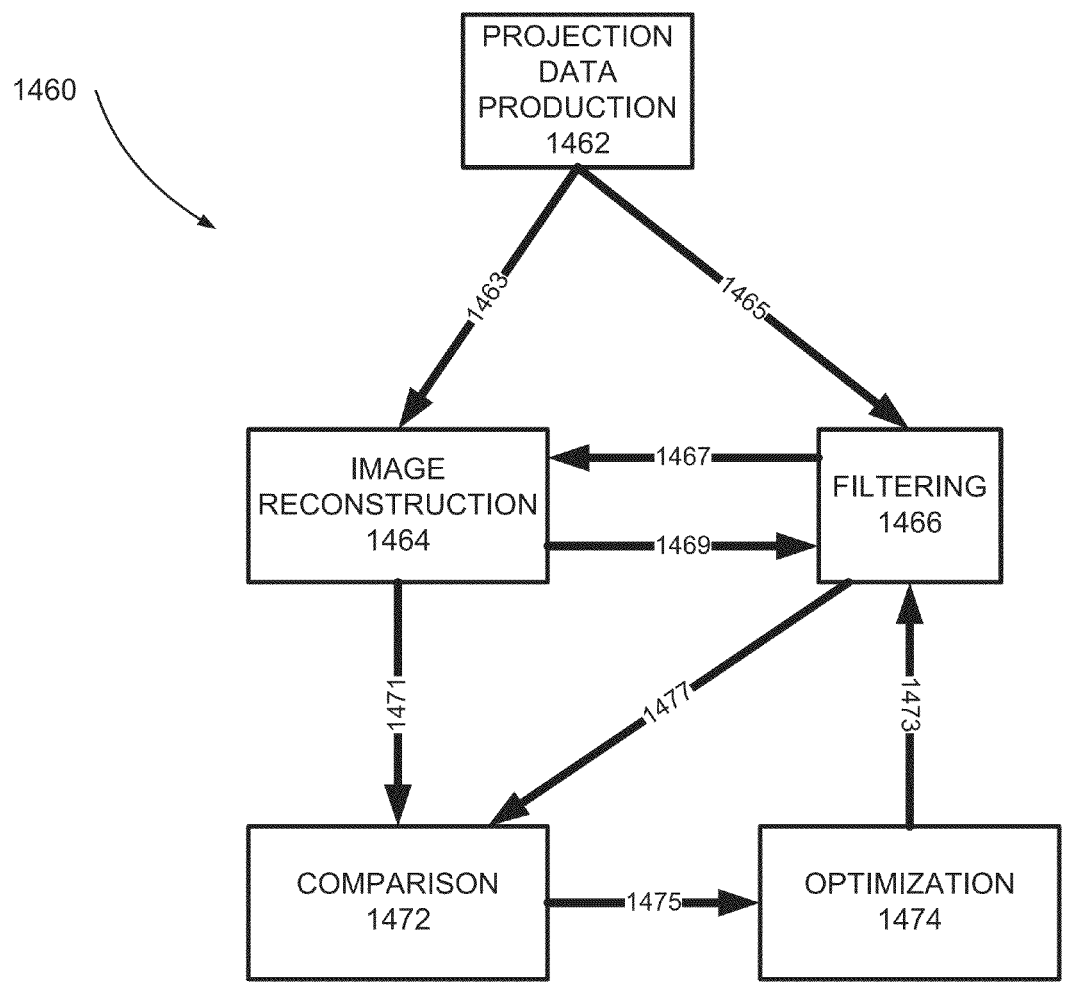
FIG. 14C is a simplified block diagram illustration of yet another example embodiment of the invention.

Reference is now made to FIG. 14C, which is a simplified block diagram illustration of yet another example embodiment of the invention.

FIG. 14C depicts a system 1460 for producing an optimized shrinkage function for a projection reconstruction system including:
  a projection data production module 1462;
  an image reconstruction module 1464;
  a filtering module 1466;
  a comparison module 1472; and
  an optimization module 1474.

The projection data production module 1462, the image reconstruction module 1464, the filtering module 1466, the comparison module 1472 and the optimization module 1474 are interconnected, such that data may optionally flow between them.

The system 1460 of FIG. 14C may optionally produce an optimized projection domain shrinkage function by:
  the projection data production module 1462 producing target projection data;
  the projection data production module 1462 sending 1463 the target projection data to the image reconstruction module 1464;
  the image reconstruction module 1464 transforming the target projection data to a target image;
  the image reconstruction module 1464 sending 1471 the target image to the comparison module 1472;
  the projection data production module 1462 also producing training projection data;
  the projection data production module 1462 sending 1465 the training projection data to the filtering module 1466;
  the filtering module 1466 applying a shrinkage function to the training projection data, producing filtered training projection data;
  the filtering module 1466 sending 1467 the filtered training projection data to the image reconstruction module 1464;
  the image reconstruction module 1464 transforming the filtered training projection data to a restored image;
  the image reconstruction module 1464 sending 1471 the restored image to the comparison module 1472;
  the comparison module 1472 comparing the target image to the restored image and producing a difference measure;
  the comparison module 1472 sending 1475 the difference measure to an optimization module 1474;

the optimization module 1474 producing an improved and/or an optimized projection domain shrinkage function; and the optimization module 1474 sending 1473 the improved and/or optimized projection domain shrinkage function to the filtering module 1466.

In some embodiments of the invention the system 1460 optionally iterates the producing an improved projection domain shrinkage function and the sending 1473 the improved projection domain shrinkage function to the filtering module 1466, and re-producing an improved filtered training projection data, and so on, optionally until the difference measure reaches a certain level, and/or stops improving.

The system 1460 of FIG. 14C may optionally produce an optimized image domain shrinkage function by:

the projection data production module 1462 producing target projection data;

the projection data production module 1462 sending 1463 the target projection data to the image reconstruction module 1464;

the image reconstruction module 1464 transforming the target projection data to a target image;

the image reconstruction module 1464 sending 1471 the target image to the comparison module 1472;

the sinogram production module 1462 also producing training projection data;

the sinogram production module 1462 sending 1463 the training projection data to the image reconstruction module 1464;

the image reconstruction module 1464 transforming the training projection data, producing a restored image;

the image reconstruction module 1464 sending 1469 the restored image to the filtering module 1466;

the filtering module 1466 applying a shrinkage function to the restored image, producing a filtered restored image;

the filtering module 1466 sending 1477 the filtered restored image to the comparison module 1472;

the comparison module 1472 comparing the target image to the filtered restored image and producing a difference measure;

the comparison module 1472 sending 1475 the difference measure to an optimization module 1474;

the optimization module 1474 producing an improved and/or an optimized image domain shrinkage function; and the optimization module 1474 sending 1473 the improved and/or optimized image domain shrinkage function to the filtering module 1466.

In some embodiments of the invention the system 1460 optionally iterates the producing an improved image domain shrinkage function and the sending 1473 the improved image domain shrinkage function to the filtering module 1466, and re-producing an improved filtered restored image, and so on, optionally until the difference measure reaches a certain level, and/or stops improving.

The system 1460 of FIG. 14C may optionally produce an optimized pair of a projection domain shrinkage function and an image domain shrinkage function by:

producing an optimized projection domain shrinkage function as described above with reference to FIG. 14C;

the projection data production module 1462 producing target projection data;

the projection data production module 1462 sending 1463 the target projection data to the image reconstruction module 1464;

the image reconstruction module 1464 transforming the target projection data to a target image;

the image reconstruction module 1464 sending 1471 the target image to the comparison module 1472;

the projection data production module 1462 also producing training projection data;

the projection data production module 1462 sending 1465 the training projection data to the filtering module 1466;

the filtering module 1466 applying the optimized shrinkage function to the training projection data, producing optimized-filter training projection data;

the filtering module 1466 sending 1467 the optimized-filter training projection data to the image reconstruction module 1464;

the image reconstruction module 1464 transforming the optimized-filter training projection data to a restored image;

the image reconstruction module 1464 sending 1469 the restored image to the filtering module 1466;

the filtering module 1466 applying an image domain shrinkage function to the restored image, producing a filtered restored image;

the filtering module 1466 sending 1477 the filtered restored image to the comparison module 1472;

the comparison module 1472 comparing the target image to the filtered restored image and producing a difference measure;

the comparison module 1472 sending 1475 the difference measure to an optimization module 1474;

the optimization module 1474 producing an improved and/or an optimized image domain shrinkage function; and the optimization module 1474 sending 1473 the improved and/or optimized image domain shrinkage function to the filtering module 1466.

In some embodiments of the invention the system 1460 optionally iterates the producing an improved image domain shrinkage function and the sending 1473 the improved image domain shrinkage function to the filtering module 1466, and re-producing an improved filtered restored image, and so on, optionally until the difference measure reaches a certain level, and/or stops improving.

It is expected that during the life of a patent maturing from this application additional relevant projection-reconstruction imaging systems will be developed and the scope of the term Computed Tomography (CT) is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of projection domain processing based on a local transform and shrinkage for use in reconstructing digital images from a set of projections, the method comprising:
    (a) providing a target image of a target object;
    (b) providing projection data of the target object;
    (c) producing filtered projection data by applying a sparsifying transform and a shrinkage function to the projection data, followed by an inverse of the sparsifying transform;
    (d) producing a restored image by applying a reconstruction transform to the filtered projection data;
    (e) comparing the restored image to the target image; and
    (f) producing an optimized projection domain shrinkage function by adapting the shrinkage function to minimize differences between the restored image and the target image.

2. The method of claim 1 in which the reconstruction transform comprises Filtered Back Projection (FBP).

3. The method of claim 1 and further comprising adjusting the projection data by applying a regularization operation to the projection data, and in which the sparsifying transform and the shrinkage function are applied to the regularized projection data.

4. The method of claim 1 in which the differences between the restored image and the target image are measured by calculating a Mean Square Error between pixels of the restored image and the target image.

5. The method of claim 1 in which the differences between the restored image and the target image are measured by calculating a faint-edge-promoting error calculation between the restored image and the target image.

6. The method of claim 1 in which the differences between the restored image and the target image are indicated by a person providing a subjective visual quality measure.

7. The method of claim 1 in which (c) to (f) are iterated in order to produce the optimized projection domain shrinkage functions by iterative improvement.

8. The method of claim 1 in which the shrinkage functions are characterized by a set of parameters comprising a set of fewer parameters than a dimension of the projection data.

9. The method of claim 1 in which the projection data is produced using a lower projection dose than a projection dose used for producing the target image.

10. The method of claim 1 in which the target object is a cadaver.

11. A method of producing a pair of projection domain and image domain shrinkage functions for use in reconstructing images from a set of projections, the method comprising:
    (a) producing an optimized projection domain shrinkage function according to the method of claim 1 and further comprising;
    (b) producing optimized projection data by applying the optimized projection domain shrinkage function to the projection data;
    (c) producing an optimized restored image by applying a reconstruction transform to the optimized projection data;
    (d) producing a filtered restored image by applying a second, image domain, shrinkage function to the optimized restored image;
    (e) comparing the filtered restored image to the optimized target image; and
    (f) producing an optimized image domain shrinkage function by adapting the second, image domain, shrinkage function to minimize differences between the filtered restored image and the target image.

12. The method of claim 11 in which the image domain shrinkage function comprises a parameter array of a smaller dimension than a dimension of the restored image.

13. A method of image domain processing based on a sparsifying transform and a shrinkage function for use in reconstructing digital images from a set of projections, the method comprising:
    (a) providing a target image of a target object;
    (b) providing projection data of the target object;
    (c) producing a restored image by applying a reconstruction transform to the projection data;

(d) producing a filtered restored image by applying a sparsifying transform, a shrinkage function, and an inverse sparsifying transform to the restored image;

(e) comparing the filtered restored image to the target image; and (f) producing an optimized image domain shrinkage function by adapting the shrinkage function to minimize differences between the filtered restored image and the target image.

14. The method of claim 13 and further comprising producing optimized projection data by applying a shrinkage function to the projection data, and in which the producing the restored image is by applying a reconstruction transform to the optimized projection data.

15. The method of claim 13 in which the differences between the restored image and the target image are measured by calculating a Mean Square Error between pixels of the restored image and the target image.

16. The method of claim 13 in which the differences between the restored image and the target image are measured by calculating a faint-edge-promoting error calculation between the restored image and the target image.

17. The method of claim 13 in which the differences between the restored image and the target image are indicated by a person providing a subjective visual quality measure.

18. The method of claim 13 in which (d) to (f) are iterated in order to produce the optimized image domain shrinkage function by iterative improvement.

19. The method of claim 13 in which the image domain shrinkage functions are characterized by a set of parameters comprising a set of fewer parameters than a dimension of the restored image.

20. The method of claim 13 in which the projection data is produced using a lower projection dose than a projection dose used for producing the target image.

21. The method of claim 13 in which the target object is a cadaver.

22. A system for producing an optimized shrinkage function for a projection reconstruction system comprising:

a projection data production module for producing first, target, projection data of a target object and second projection data of the target object;

an image reconstruction module for producing a target image by applying a reconstruction transform to the first projection data, and a second restored image by applying a reconstruction transform to the second projection data;

a filtering module configured for producing at least one selected from a group consisting of:

filtered projection domain projection data, by applying a sparsifying transform and a projection domain shrinkage function; and a filtered image domain second image, by applying a sparsifying transform and an image domain shrinkage function;

a comparison module for comparing the target image and the second image configured to produce a difference measure; and an optimization module for producing at least one selected from a group consisting of:

an optimized projection domain shrinkage function; and an optimized image domain shrinkage function, by minimizing the difference measure.

* * * * *